(12) United States Patent
Imanaka

(10) Patent No.: US 8,373,966 B2
(45) Date of Patent: Feb. 12, 2013

(54) STRUCTURAL BODY, CAPACITOR, AND METHOD OF FABRICATING THE CAPACITOR

(75) Inventor: Yoshihiko Imanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 344 days.

(21) Appl. No.: 12/575,791

(22) Filed: Oct. 8, 2009

(65) Prior Publication Data

US 2010/0123996 A1    May 20, 2010

(30) Foreign Application Priority Data

Nov. 17, 2008  (JP) ................................. 2008-293792

(51) Int. Cl.
*H01G 4/018*  (2006.01)

(52) U.S. Cl. ..... 361/313; 361/311; 361/312; 361/321.2; 361/306.3; 361/505

(58) Field of Classification Search .................. 361/311, 361/312, 313, 321.2, 306.3, 505, 524, 525
See application file for complete search history.

(56) References Cited

U.S. PATENT DOCUMENTS

| 6,514,603 B2 * | 2/2003 | Chazono ........................ 428/213 |
| 6,780,494 B2 * | 8/2004 | Kobayashi et al. ........... 428/210 |

FOREIGN PATENT DOCUMENTS

| JP | 05-047589 A | 2/1993 |
| JP | 2008-16578 A | 1/2008 |

OTHER PUBLICATIONS

Japanese Office Action dated Oct. 30, 2012, issued in corresponding Japanese Patent Application No. 2008-293792, with English translation (6 pages).

\* cited by examiner

*Primary Examiner* — Nguyen T Ha
*Assistant Examiner* — Hung Dang
(74) *Attorney, Agent, or Firm* — Westerman, Hattori, Daniels & Adrian, LLP

(57) ABSTRACT

A structural body which includes a first dielectric layer formed on a first substrate and including first conductive particles, each surface of the first conductive particles being entirely covered with a first dielectric film; and a second dielectric layer formed on the first dielectric layer wherein a volume ratio of a dielectric in the second dielectric layer is higher than a volume ratio of a dielectric in the first dielectric layer.

17 Claims, 19 Drawing Sheets

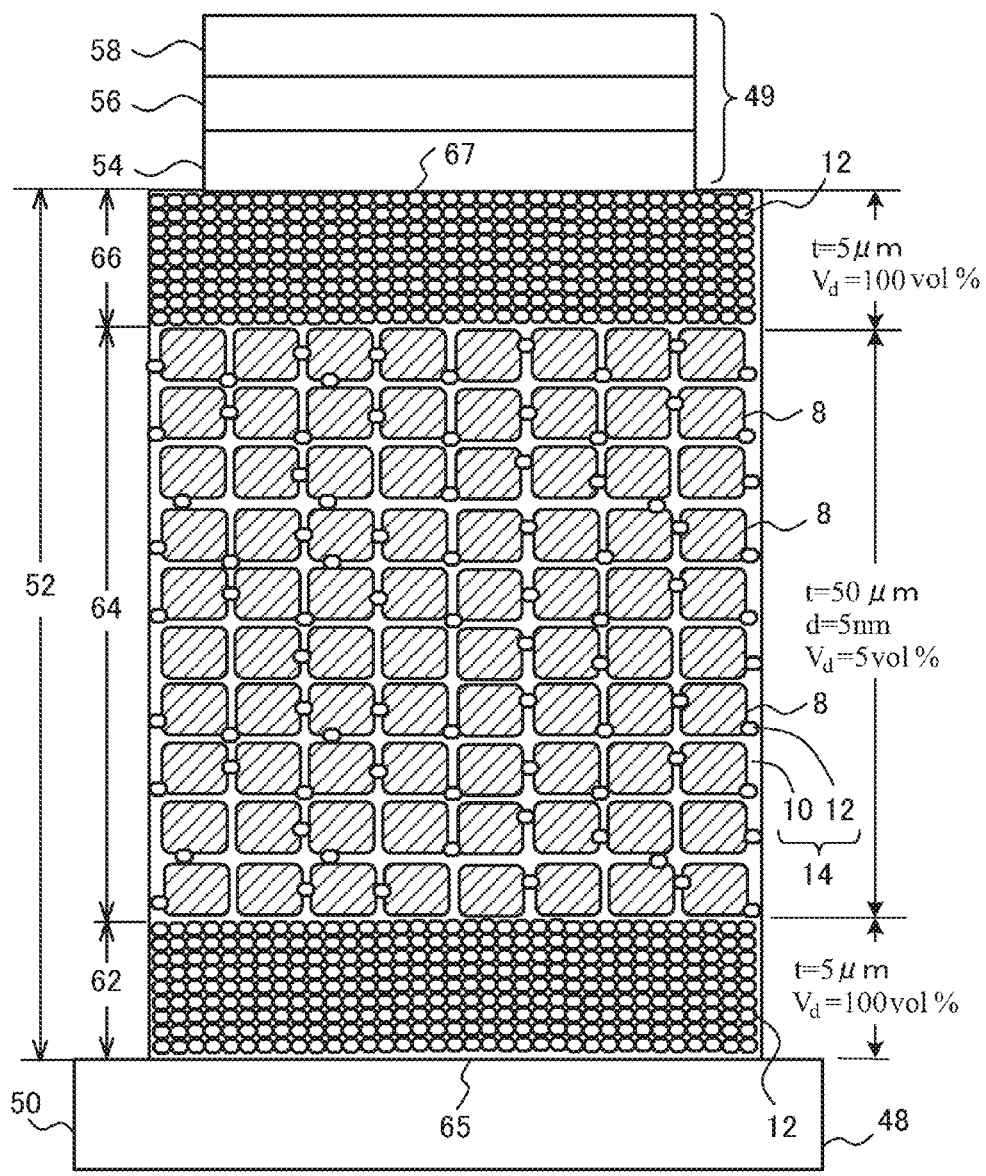

FIG. 10

TABLE 1

| | BASIC STRUCTURE/ SUBSTRATE | DIELECTRIC LAYER | THICKNESS OF DIELECTRIC LAYER ($\mu m$) | CAPACITANCE DENSITY ($\mu F/cm^2$) | VOLTAGE (ELECTRIC FIELD INTENSITY) AT WHICH LEAKAGE CURRENT ASSUMES $10^{-7}$ A/cm² | WITHSTAND VOLTAGE (V) |
|---|---|---|---|---|---|---|
| EMBODIMENT 1 | ELECTROLYTIC CAPACITOR SPECIFICATIONS/ ALUMINUM FOIL | • BaTiO₃ PARTICLES/<br>• Al PARTICLES (OXIDE FILM 5 nm) + BaTiO₃ PARTICLES (5 VOL%)/<br>• BaTiO₃ PARTICLES | 60 | 200 | 15V (0.25kV/mm) | 20 |
| EMBODIMENT 2 | ELECTROLYTIC CAPACITOR SPECIFICATIONS/ ALUMINUM FOIL | • Al PARTICLES (OXIDE FILM 5 nm) + BaTiO₃ PARTICLES (20 VOL%)/<br>• Al PARTICLES (OXIDE FILM 5 nm) + BaTiO₃ PARTICLES (10 VOL%)/<br>• Al PARTICLES (OXIDE FILM 5 nm) + BaTiO₃ PARTICLES (5 VOL%)/<br>• Al PARTICLES (OXIDE FILM 5 nm) + BaTiO₃ PARTICLES (10 VOL%)/<br>• Al PARTICLES (OXIDE FILM 5 nm) + BaTiO₃ PARTICLES (20 VOL%) | 60 | 300 | 15V (0.25kV/mm) | 10 |
| EMBODIMENT 3 | ELECTROLYTIC CAPACITOR SPECIFICATIONS/ ALUMINUM FOIL | • Al PARTICLES (OXIDE FILM: 300 nm)/<br>• Al PARTICLES (OXIDE FILM: 100 nm)/<br>• Al PARTICLES (OXIDE FILM: 10 nm)/<br>• Al PARTICLES (OXIDE FILM: 100 nm)/<br>• Al PARTICLES (OXIDE FILM: 300 nm) | 60 | 300 | 15V (0.25kV/mm) | 10 |

TABLE 2   FIG. 11

| | BASIC STRUCTURE/ SUBSTRATE | DIELECTRIC LAYER | THICKNESS OF DIELECTRIC LAYER ($\mu m$) | CAPACITANCE DENSITY ($\mu F/cm^2$) | VOLTAGE (ELECTRIC FIELD INTENSITY) AT WHICH LEAKAGE CURRENT ASSUMES $10^{-7}$ A/cm² | WITHSTAND VOLTAGE (V) |
|---|---|---|---|---|---|---|
| EMBODIMENT 4 | ELECTROLYTIC CAPACITOR SPECIFICATIONS/ ALUMINUM FOIL | • Al PARTICLES (OXIDE FILM: 300 nm) + BaTiO₃ PARTICLES (20 VOL%)/ • Al PARTICLES (OXIDE FILM: 100 nm) + BaTiO₃ PARTICLES (10 VOL%)/ • Al PARTICLES (OXIDE FILM: 10 nm) + BaTiO₃ PARTICLES (5 VOL%)/ • Al PARTICLES (OXIDE FILM: 100 nm) + BaTiO₃ PARTICLES (10 VOL%)/ • Al PARTICLES (OXIDE FILM: 300 nm) + BaTiO₃ PARTICLES (20 VOL%) | 60 | 600 | 15V (0.25kV/mm) | 10 |
| COMPARATIVE EXAMPLE | ELECTROLYTIC CAPACITOR SPECIFICATIONS/ ALUMINUM FOIL | • Al PARTICLES (OXIDE FILM 5 nm) + BaTiO₃ PARTICLES (10 VOL%) | 20 | 100 | 2V (0.1kV/mm) | 3 |
| REFERENCE 1 | CERAMIC CAPACITOR SPECIFICATIONS (SINGLE LAYER) | BARIUM TITANATE | 1 | 2.5 | 10V (10kV/mm) | 20 |
| REFERENCE 2 | ELECTROLYTIC CAPACITOR SPECIFICATIONS/ ALUMINUM FOIL | CHEMICAL CONVERSION ALUMINUM OXIDE FILM | 150 | 200 | 5V (33kV/mm) | 10 |
| REFERENCE 3 | SUBSTRATE EMBEDDED CAPACITOR SPECIFICATIONS | SOL-GEL BARIUM TITANATE FILM | 500 | 1.0 | 2V (4kV/mm) | 10 |

STRUCTURAL BODY, CAPACITOR, AND METHOD OF FABRICATING THE CAPACITOR

CROSS-REFERENCE TO RELATED APPLICATION

This application is based upon and claims the benefit of priority of the prior Japanese Patent Application No. 2008-293792, filed on Nov. 17, 2008, the entire contents of which are incorporated herein by reference.

FIELD

The embodiments discussed herein are related to a structural body, a capacitor, and a method of fabricating the capacitor.

BACKGROUND

A capacitor is an indispensable component for electronic equipment which serves as a decoupling capacitor for suppressing noise generated by such electronic equipment, a coupling capacitor for eliminating the difference in d.c. potential between electronic devices, a component of a filter, or the like. With recent downsizing of electronic equipment, downsizing of such a capacitor has been requested.

Capacitors suitable for downsizing include a ceramic capacitor and an aluminum electrolytic capacitor. These capacitors have a high capacitance per unit volume and hence can maintain a relatively high capacitance even when downsized.

Japanese Patent Laid-Open No. HEIS-47589 discloses a ceramic capacitor which ensures a required capacitance by forming a dielectric layer from a ferroelectric material such as barium titanate. A stacked ceramic capacitor, which has a further increased capacitance than the ceramic capacitor, includes alternately stacked electrodes and dielectric layers. The aluminum electrolytic capacitor realizes an increased capacitance by expanding the surface area of an anode foil by making the anode foil surface rough.

In order for such a conventional capacitor to have a high capacitance, a complicated and precise fabrication process is necessary. Therefore, the fabrication cost increases in order to impart such a capacitor with a high capacitance.

SUMMARY

According to an aspect of the invention, a structural body includes: a first dielectric layer formed on a first substrate and including first conductive particles, each surface of the first particle being entirely covered with a first dielectric film; and a second dielectric layer formed on the first dielectric layer wherein a volume ratio of a dielectric in the second dielectric layer is higher than a volume ratio of a dielectric in the first dielectric layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a sectional view illustrating a structure of an upper half of a capacitor film;

FIG. 10 is a table illustrating data on capacitors according to embodiments 1 to 3;

FIG. 11 is a table illustrating data on capacitors according to embodiment 4, comparative example and reference examples;

DESCRIPTION OF EMBODIMENTS

The inventor has been studying a film deposition method including jetting powder comprising a bonding structure of fine particles, together with a gas, to fix the powder onto a substrate (hereinafter will be referred to as "gas deposition method"). In the process of the study, the inventor examined the structure and physical properties of a metal film formed by the gas deposition method using raw material powder comprising conductive particles each having a surface covered with a dielectric film (for example Al particles each having an oxidized surface).

According to the gas deposition method, fine particles are accelerated by the gas to a velocity not less than the velocity of sound so as to intensely collide with a substrate. The impact of the collision causes the fine particles to be fixed onto the substrate, thereby forming a thick film.

The fine particles thus fixed onto the substrate have been deformed by the impact of the collision to such an extent as to retain nothing of their original forms. Therefore, it has been unclear whether the dielectric film having covered the surface of each conductive particle still covers the particle surface even after the collision or metal fine particles have broken through their respective dielectric films to bond together.

In this respect, researchers concerned with a gas deposition have considered that an active newly formed surface emerges by breaking through the oxide film or the like covering the surface of each particle upon collision to cause the particles to be bonded together.

Figure 1:
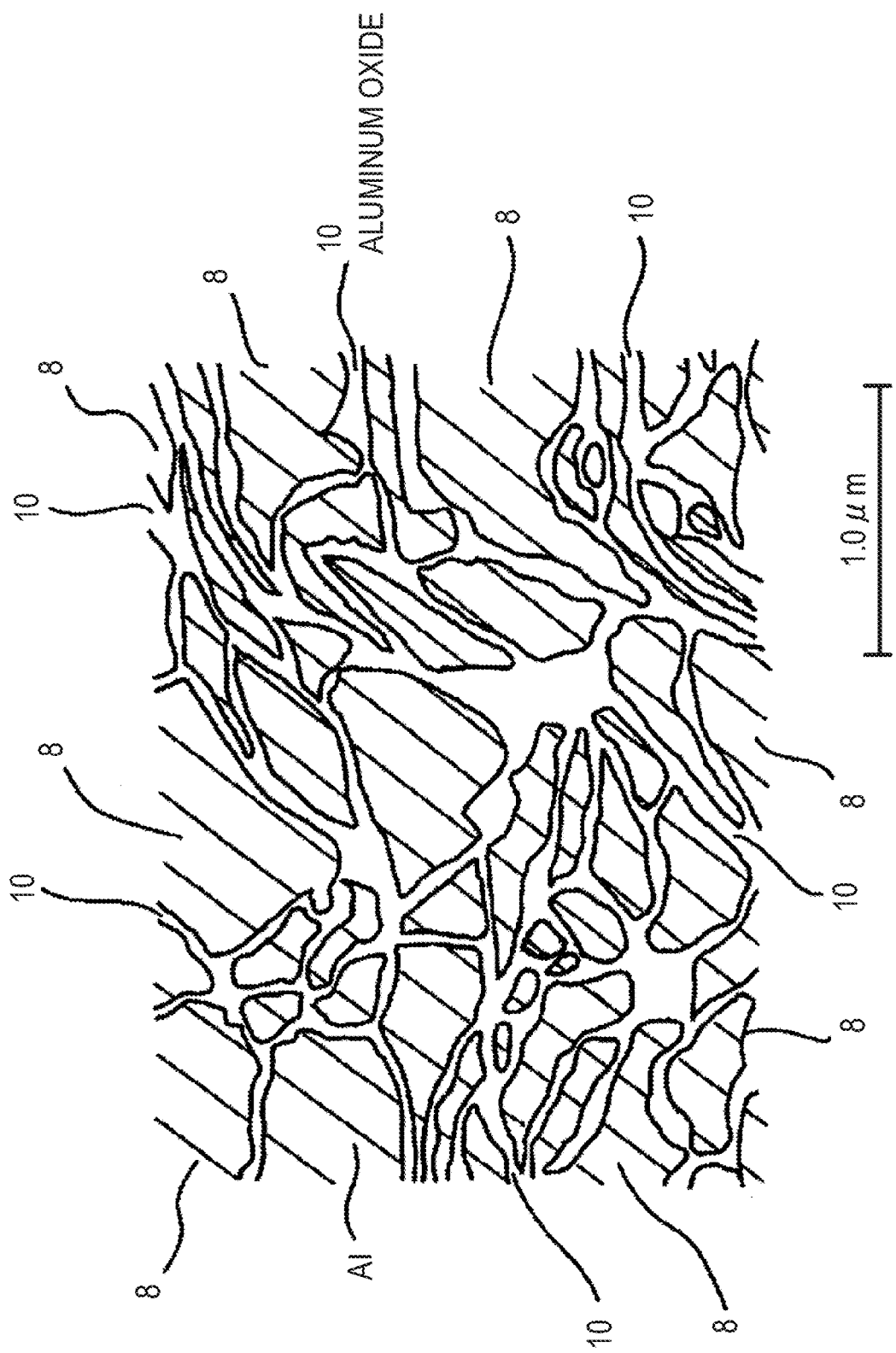
FIG. 1 is a view illustrating a transmission electron microscope image of a section of a deposited film formed by a gas deposition method using as raw material Al powder comprising particles with each particle-having a surface covered with aluminum oxide.

FIG. 1 is a view illustrating a transmission electron microscope image of a section of a deposited film formed by fixing Al powder comprising particles each having a surface covered with aluminum oxide onto an aluminum foil according to the gas deposition method. Hereinafter, like reference characters will designate like or corresponding parts throughout different figures in order to omit description thereof.

The Al powder used to form the deposited film comprises a bonding structure of Al particles having an average particle diameter of 3 μm±1 μm and each having a surface covered with aluminum oxide having a thickness of 10 to 100 nm. (The numeric value following "±" represents a standard deviation.) The film deposition condition used is the same as a film deposition condition used for a second layer 64 according to embodiment 1 to be described later. The average particle diameter of the Al particles is a value measured by a centrifugal precipitation method.

Figure 2:
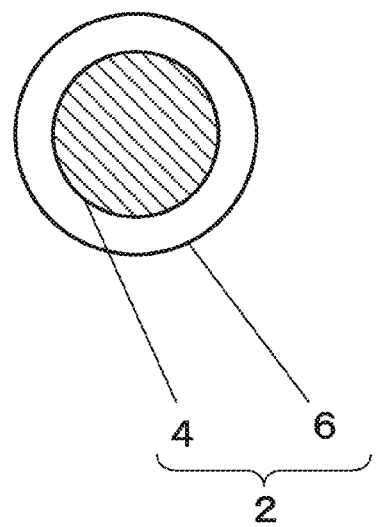
FIG. 2 is a view illustrating a sectional structure of a conductive particle having a surface covered with a dielectric film, in a state prior to deposition.

FIG. 2 is a view illustrating a sectional structure of a fine particle in a state prior to deposition. As illustrated in FIG. 2, fine particle 2 forming raw material powder includes a conductive particle 4 (an Al particle used here), and a dielectric 6 (aluminum oxide used here) covering the entire surface of the conductive particle 4. The fine particle 2 is shaped substantially spherical.

In the deposited film formed by collision of fine particles 2 with a substrate, the Al particles 8 are deformed substantially as illustrated in FIG. 1. However, individual Al particles 8 are separated from each other by aluminum oxide layers 10 intervening therebetween. That is, the entire surface of each Al particle 8 (i.e., metal particle) is still covered with aluminum oxide (i.e., dielectric) even in the deposited film.

The film deposition method described with reference to FIGS. 1 and 2 is not based on the film deposition mechanism having been considered by the researchers according to which an intense impact causes a newly formed surface to be exposed thereby securely bonding particles together. The film deposition method is based on a mechanism that causes individual particles to be elastically deformed to such an extent as not to break the dielectric film formed over the surface of each particle, thereby causing the individual particles to be integrated and bonded together by utilizing the plasticity of the metal forming the core portion of each particle. That is, the present film deposition method is a method which uses fine particles as a raw material and utilizes plastic deformation of metal.

Next, the inventor examined electrical characteristics of such a deposited film. As predicted from the structure having individual Al particles 8 separated from each other by aluminum oxide films 10 having an insulating property, the deposited film exhibited a very high resistance value and hence had an insulating property.

Based on the result thus obtained, the inventor examined the applicability of the above-described deposited film to a dielectric layer of a capacitor (i.e., the layer sandwiched between electrodes of the capacitor). For this purpose, the inventor prepared a sample in which the above-described deposited film is used. The sample includes: the deposited film; a metal electrode as an upper electrode formed on an upper surface of the deposited film; and an aluminum foil substrate as a lower electrode provided on a lower surface of the deposited film. The sample was measured for a capacitance per unit area (i.e., capacitance density). The deposited film had a thickness of about 250 μm.

The capacitance density obtained by the measurement was 30 μF/cm2, which was a very high value exceeding the capacitance density of a conventional capacitor. For example, even a ceramic capacitor using a dielectric layer of barium titanate having a high dielectric constant which is made as thin as about 1 μm, has a capacitance density of no more than 2.5 μF/cm2.

It can be inferred that the capacitance density was increased because adjacent Al particles 8 were capacitively coupled to each other through very thin aluminum oxide 10.

The gas deposition method is a simple and inexpensive method of forming a thick film. Based on the above-described knowledge, the inventor proceeded with a study of a capacitor using a deposited film formed by the gas deposition method as a dielectric layer.

In the study, the inventor examined film deposition conditions for further increasing the capacitance density of the deposited film formed by gas deposition. The results of the examination proved that the capacitance density increased as the dielectric 6 covering the surface of each conductive particle 4 became thinner. The results of the examination also proved that the capacitance density of the deposited film was increased by mixing fine particles having a high dielectric constant (e.g., barium titanate (BaTiO3) particles) with raw material powder.

Figure 3:
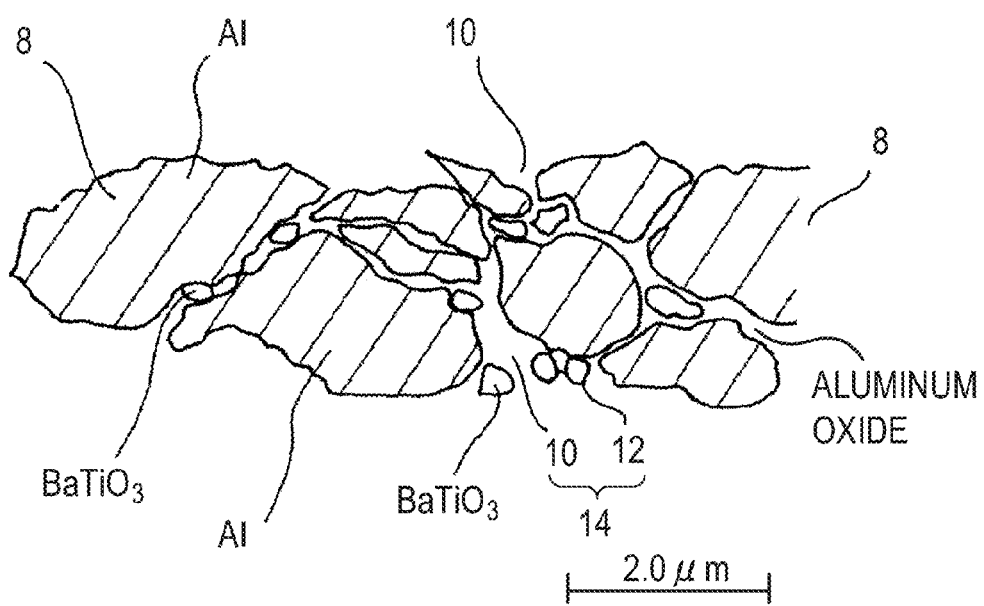
FIG. 3 is a view illustrating a transmission electron microscope image of a section of a deposited film formed by the gas deposition method using as raw material mixed powder of Al powder comprising particles with each particle having a surface covered with aluminum oxide and barium titanate (BaTiO3) particles.

FIG. 3 is an image of a section of a structural body formed by the gas deposition method using as raw material powder mixed powder of Al particles each having a surface covered with aluminum oxide and fine particles of barium titanate (BaTiO3). The aluminum oxide has a thickness of 10 to 100 nm. The Al powder has an average particle diameter of 3 μm±1 μm. The fine particles of barium titanate have a particle diameter of about 100 nm. The volume ratio of barium titanate to the mixed powder is 5% (hereinafter will be expressed as "5 vol %" for example). The specific film deposition conditions are just as in the case of the second layer 64 according to embodiment 1 to be described later.

The results of measurement proved that the deposited film had a very high capacitance density of 100 μF/cm2. At that time, the deposited film had a thickness of about 10 μm.

As illustrated in FIG. 3, the barium titanate fine particles 12 mixed with the raw material powder are contained in the deposited film in such a manner that the fine particles 12 are dispersed in a continuum of aluminum oxide 10 covering the surfaces of the Al particles 8.

Barium titanate is a dielectric having a very high relative permittivity, which is as high as 3,000. When particles of such a dielectric are dispersed in a dielectric film 14 intervening between conductive particles (i.e., Al particles 8), the dielectric film 14 has an increased dielectric constant on average. For this reason, the deposited film is inferred to have an increased capacitance density.

Figure 4:
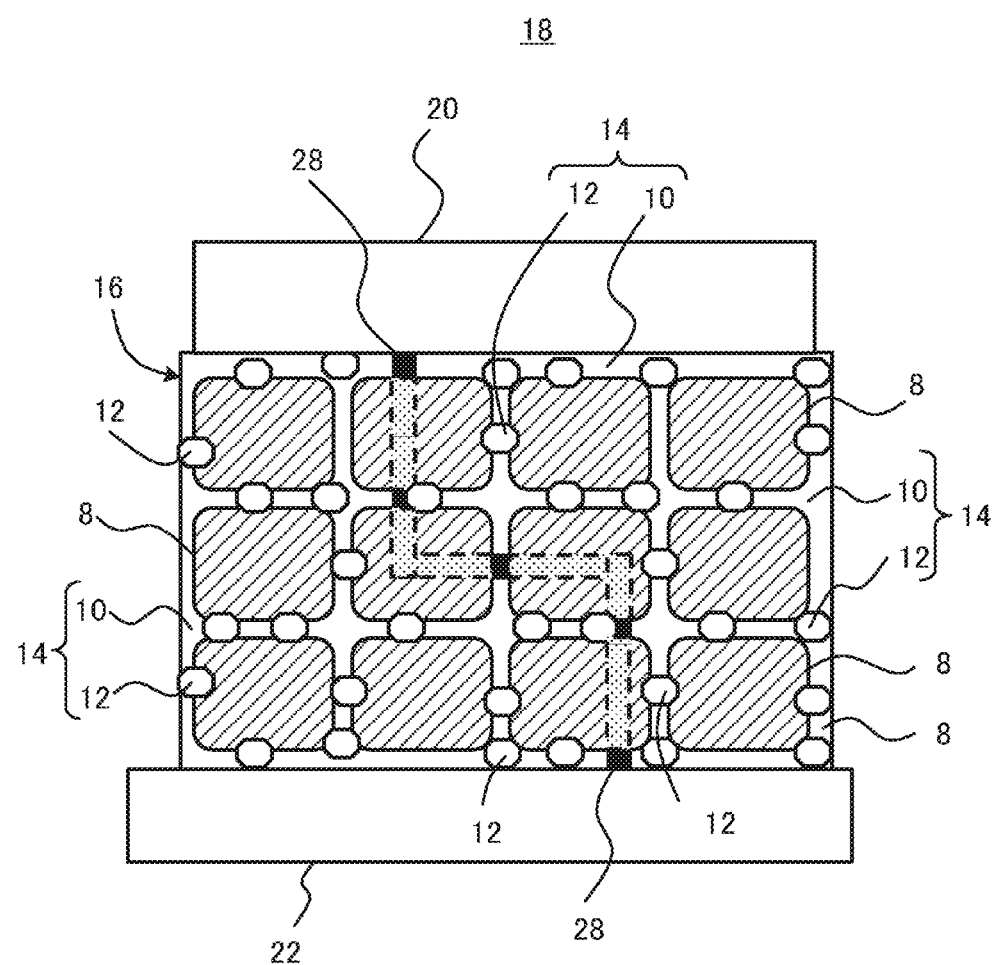
FIG. 4 is a sectional view illustrating a structure of a capacitor using the deposited film illustrated in FIG. 3 as a dielectric layer.

FIG. 4 is a sectional view illustrating a structure of a capacitor 18 using the deposited film illustrated with reference to FIG. 3 as a dielectric layer 16. As illustrated in FIG. 4, the capacitor 18 includes the dielectric layer 16 formed by the gas deposition method, and upper and lower electrodes 20 and 22 sandwiching the dielectric layer 16 therebetween. The capacitor illustrated in FIG. 4 uses as the dielectric layer 16 the deposited film in which the barium titanate fine particles 12 are dispersed in the dielectric film 14. However, the following description also holds true for a capacitor which includes as a dielectric layer a deposited film in which dielectric particles, such as barium titanate particles 12, are not dispersed (see FIG. 1).

As illustrated in FIG. 4, the Al particles 8 as conductive particles make up a major proportion of the dielectric layer 16. For this reason, upon application of voltage to the capacitor 18, an electric field is applied to the dielectric film 14 intervening between Al particles 8. The dielectric film 14 is a structural body composed of aluminum oxide 10 and barium titanate fine particles (i.e., a member formed by combination of plural portions which are different in properties from each other). Therefore, the withstand voltage and the leakage current of the capacitor 18 are determined from the resistance of the dielectric film 14.

Figure 5:
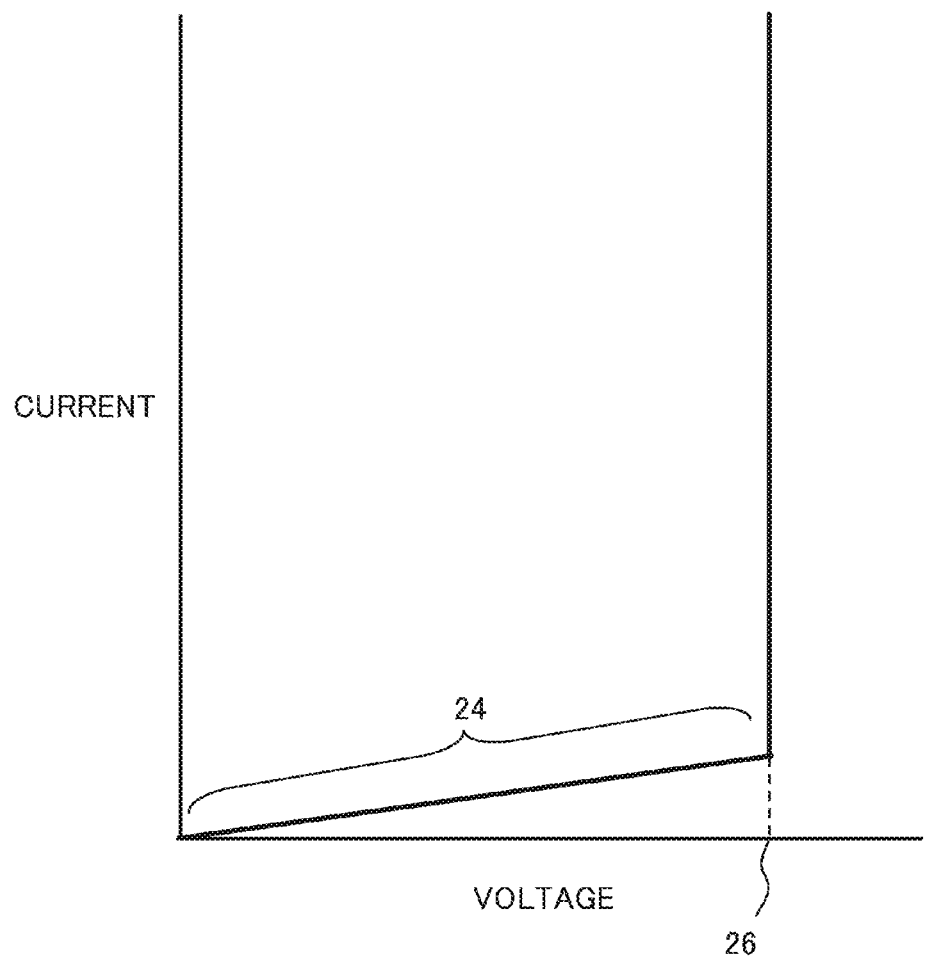
FIG. 5 is a view illustrating a relationship between withstand voltage and leakage current of a capacitor.

FIG. 5 is a view illustrating a relationship between withstand voltage and leakage current of a capacitor. The horizontal axis represents the voltage applied to the capacitor. The vertical axis represents the current passing through the capacitor. When voltage is applied to the capacitor, passage of a feeble leakage current 24 occurs. However, as the voltage increases, a breakdown occurs at a certain point to cause the current to increase abruptly. The voltage at which the current increases abruptly is a withstand voltage 26.

As described above, the voltage applied to the capacitor 18 is substantially applied to the thin dielectric film 14 intervening between Al particles 8. For this reason, a capacitor using a deposited film as described with reference to FIG. 1 or 3 as the dielectric layer is likely to allow the breakdown to occur because the dielectric film 14 is thin. Further, such a capacitor is likely to form a current path 28 (which allows current to pass therethrough easily) at which a thinned portion of the dielectric film 14 is continuous with conductive particles (i.e., Al particles 8). For this reason, an increased leakage current occurs.

Evaluation of electrical characteristics of the above-described capacitor 18 conducted by the inventor proved that the capacitor 18 was capable of ensuring a withstand voltage of not less than 5 V. With a withstand voltage of not less than 5 V being ensured, the capacitor can be put to practical use. It was also proved that the capacitor 18 was capable of ensuring a reduced leakage current which is comparable to the leakage current of the electrolytic capacitor.

However, the capacitor 18 was not able to reduce the leakage current to a value as low as the low leakage current of the ceramic capacitor. Therefore, a further reduction in leakage current is necessary for the above-described capacitor to be put to practical use.

Further, the capacitor 18 has another problem of large variations in capacitor characteristics (including capacitance, withstand voltage, leakage current and the like). For this reason, the yield of the capacitor 18 is not sufficient.

The withstand voltage and the leakage current can be improved by making thicker the dielectric film 14 intervening between conductive particles (i.e., Al particles 8). However, the capacitance of the capacitor 18 lowers as the dielectric film 14 becomes thicker. Thus, the leakage current (and the withstand voltage) and the capacitance have a tradeoff relation therebetween.

Figure 6:
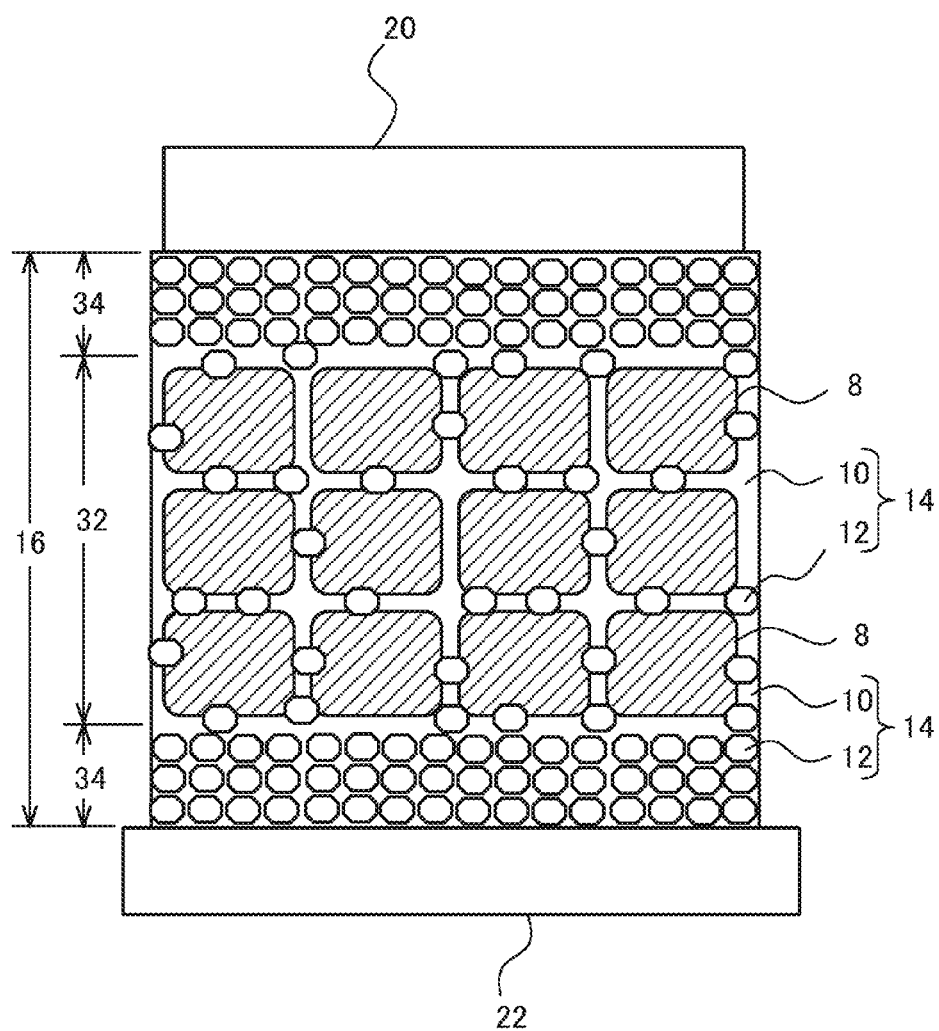
FIG. 6 is a sectional view illustrating a structure of a capacitor according to an embodiment.

FIG. 6 is a sectional view illustrating a structure of a capacitor 30 according to an embodiment. As illustrated in FIG. 6, the capacitor 30 according to the present embodiment has the dielectric layer 16 including therewithin a first dielectric layer 32 having thin dielectric films 14. A second dielectric layer 34 having a higher dielectric volume ratio than the first dielectric layer 32 is provided adjacent to each of the upper and lower electrodes 20 and 22. In the example illustrated in FIG. 6, the second dielectric layers 34 are each entirely formed of a dielectric (i.e., barium titanate fine particles 12).

For this reason, the capacitor 30 according to the present embodiment allows the second dielectric layers 34 to prevent formation of the current path. Therefore, the present capacitor 30 exhibits a reduced leakage current.

The major part of the dielectric layer 16 is formed of a deposited film having an effective dielectric constant increased by the thin dielectric films 14 intervening between the conductive particles (i.e., Al particles 8). Therefore, the present capacitor 30 has an increased capacitance. The "effective dielectric constant" is an effective dielectric constant calculated by regarding an insulating layer which is not an actual dielectric (for example the deposited film described with reference to FIG. 1) as a dielectric.

The capacitor 30 according to the present embodiment includes the first dielectric layer 32. The first dielectric layer 32 is formed by causing first conductive particles (e.g., Al particles 8) each having the outer surface entirely covered with a first dielectric film (e.g., aluminum oxide 10) to collide with a first substrate (e.g., second dielectric layer 34). Upon collision, the first conductive particles are fixed onto the first substrate with their respective first surfaces each remaining entirely covered with the first dielectric film (e.g., aluminum oxide 10). The capacitor 30 according to the present embodiment further includes the second dielectric layers 34. Each of the second dielectric layers 34 has a higher dielectric volume ratio than the first dielectric layer 32. In the capacitor 30 according to the present embodiment, a first electrode (i.e., lower electrode 22) is formed on a first major surface of a structural body comprising a stack of the first dielectric layer 32 and the second dielectric layers 34. A second electrode (i.e., upper electrode 20) is formed on a second major surface of the structural body.

Stated otherwise, the capacitor 30 according to the present embodiment includes the first dielectric layer 32 provided on the first substrate (i.e., that second dielectric layer 34 which is located on the first electrode 22 side), and the second dielectric layer 34 stacked on the first dielectric layer 32. The first dielectric layer 32 contains a plurality of first conductive particles (e.g., Al particles 8). The first conductive particles each have the outer surface entirely covered with the first dielectric film (e.g., aluminum oxide 10). In the first dielectric film 32, the plurality of first conductive particles (e.g., Al particles 8) are isolated from each other by the first dielectric film (e.g., aluminum oxide 10). The second dielectric layer 34 has a higher dielectric volume ratio than the first dielectric layer. Further, the capacitor 30 according to the present embodiment includes the two second dielectric layers 34 as described above. The above-described first dielectric layer is interposed between the two second dielectric layers 34.

Embodiment 1

(1) Structure

Figure 7:
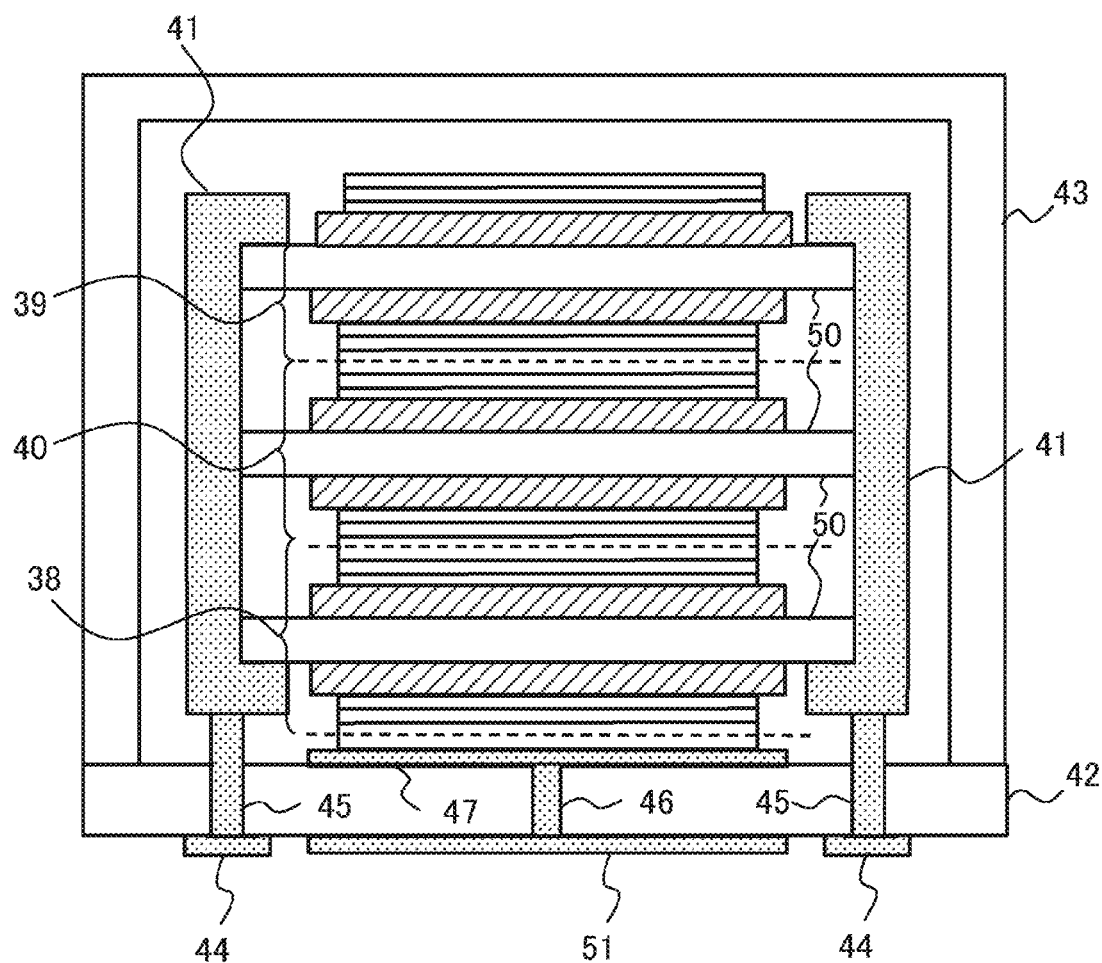
FIG. 7 is a sectional view illustrating a structure of a capacitor according to embodiment 1.

FIG. 7 is a sectional view illustrating a structure of a capacitor 36 according to the present embodiment.

The capacitor 36 includes plural capacitor films 38, 39 and 40. The capacitor films 38, 39 and 40 are stacked on each other, and the opposite ends of this stack are fixed by respective metal foils 41.

The capacitor films 38, 39 and 40 are fixed onto a substrate 42 with their opposite ends fixed by the metal foils 41. A sheathing case 43 is fixed onto the substrate 42 so as to cover the capacitor films 38, 39 and 40.

The metal foils 41 are each electrically connected to side surfaces of aluminum foils 50 each serving as a substrate for a respective one of the capacitor films 38, 39 and 40. Each of the metal foils 41 is electrically connected to a first terminal 44 provided on the underside of the substrate 42 via an interconnection wire 45 passing through a via hole which extends through the substrate 42.

As will be described later, a carbon film is bonded to each of the upper and lower surfaces of each of the capacitor films 38, 39 and 40 by means of silver paste. That carbon film which is provided on the lower surface of the lowermost capacitor film 38 is bonded to a pad 47 provided on the upper surface of the substrate 42 by means of silver paste.

The pad 47 is electrically connected to a second terminal 51 provided on the underside of the substrate 42 via an interconnection wire 46 passing through a via hole which extends through the substrate 42.

Figure 8:
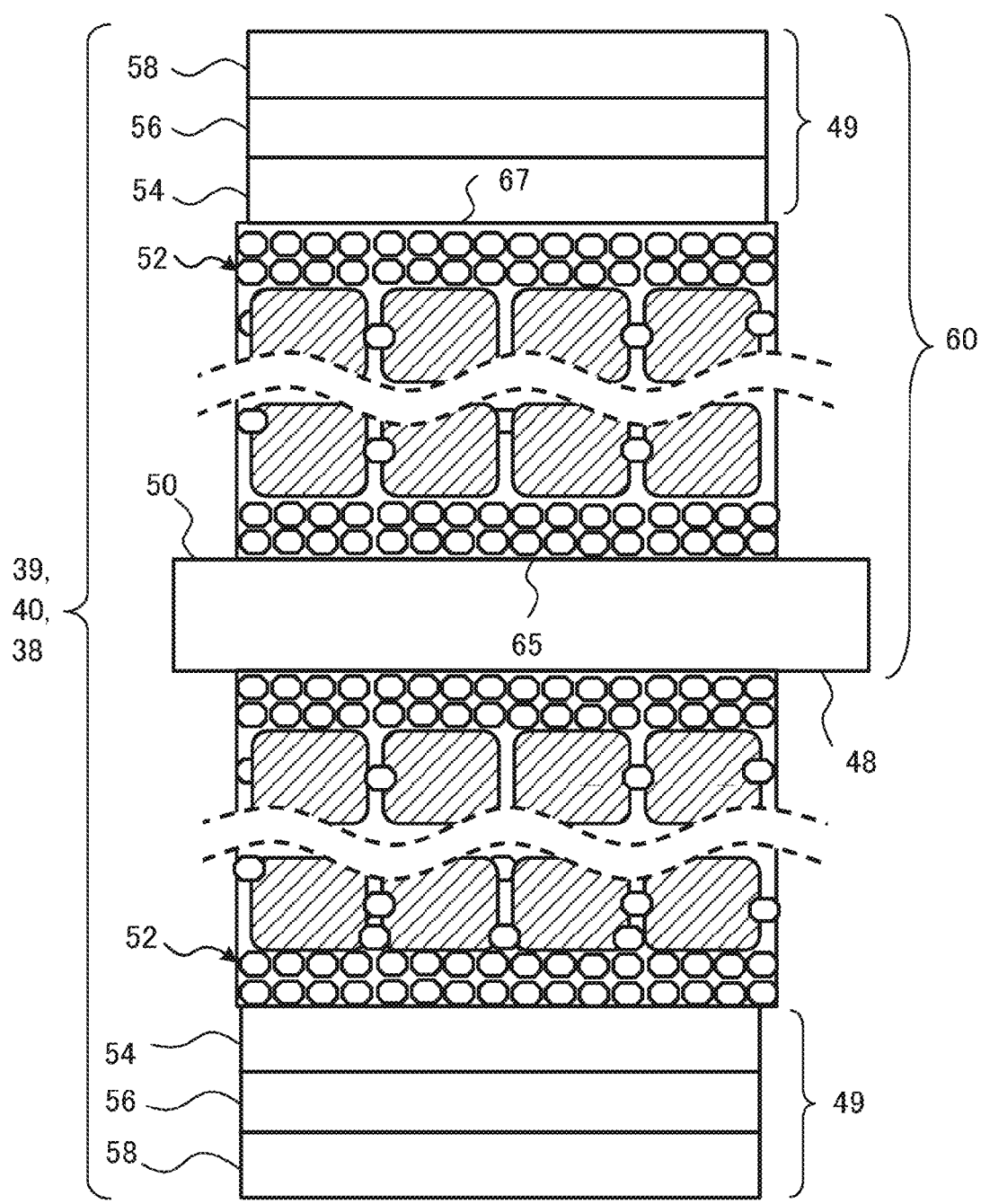
FIG. 8 is a sectional view illustrating a structure of a capacitor film according to embodiment 1.

FIG. 8 is a sectional view illustrating a structure of a capacitor film 38, 39, 40.

The capacitor film 38, 39, 40 is formed using aluminum foil 50 as a substrate (see FIG. 8). On opposite sides of the aluminum foil 50 there are formed dielectric layers (i.e., structural bodies) 52 by the gas deposition method. A conductive polymer film 54 is formed over each dielectric layer 52 by application of a paste-like conductive polymer. Paste-like carbon is applied onto the conductive polymer film 54 to form a carbon film 56. Further, silver paste 58 is applied onto the carbon film 56. The silver paste 58 serves to mechanically bond and electrically connect adjacent capacitor films 38, 39, 40 to each other. The silver paste 58 is a member shared by adjacent stacked capacitor films.

The aluminum foil 50 serves as a first electrode 48 of the capacitor film 38, 39, 40.

The stacks of conductive polymer film 54, carbon film 56 and silver paste 58 provided on the opposite sides of the aluminum foil 50 form second electrodes 49 which are electrically connected to each other via a lead wire (not illustrated).

The carbon films 56 of adjacent capacitor films are electrically connected to each other via silver paste 58. Therefore, all the second electrodes 49 of respective capacitor films 38, 39 and 40 are electrically connected to each other.

All the first electrodes 48 of respective capacitor films 38, 39 and 40 are electrically connected to each other via the metal foils 41.

As apparent from the structure described with reference to FIG. 7, the electrically interconnected first electrodes 48 of the capacitor films 38, 39 and 40 are electrically connected to the first terminals 44. Further, the electrically interconnected second electrodes 49 of the capacitor films 38, 39 and 40 are electrically connected to the second terminal 51.

FIG. 9 is a sectional view illustrating a structure of an upper portion 60 (i.e., a portion formed on the upper side of the aluminum foil 50) of the capacitor film 38, 39, 40. Though a lower portion of the capacitor film 38, 39, 40 is not illustrated, the lower portion has the same structure as the upper portion 60 illustrated in FIG. 9.

Description will be made of the structure of the capacitor film 38, 39, 40 in accordance with a fabrication method thereof.

Initially, a barium titanate layer (i.e., first layer 62) having a thickness of about 5 µm is deposited over the aluminum foil 50 having a thickness of about 50 µm by the gas deposition method. The raw material powder used comprises a bonding structure of barium titanate particles having an average particle diameter of about 50 nm.

The deposition of the barium titanate layer is conducted according to a method to be described later in the "(2) Gas Deposition Method". Deposited film formation according to the gas deposition method, which will occur in the following description, is carried out in the same manner as the deposition of the barium titanate layer. The symbol "t" used in FIG. 9 represents the thickness of each deposited layer. (The same holds true for other figures to be referred to later.) The symbol "Vd" represents the volume ratio of barium titanate particles to the raw material powder. (The same holds true for other figures to be referred to later.)

Subsequently, a deposited film (i.e., second layer 64) having a thickness of about 50 µm is deposited over the barium titanate layer (i.e., first layer 62) by the gas deposition method. The raw material powder used here is mixed powder prepared by adding 5 vol % (volume ratio) of barium titanate particles to surface-oxidized aluminum particles. The average particle diameter of the aluminum particles is 3 µm±1 µm. The average particle diameter of the barium titanate particles is about 50 nm.

The "surface oxidation" is a heat treatment of aluminum particles at 550° C. for five hours in the atmosphere. (The same holds true for other embodiments to be described later.) The entire surface of each aluminum particle is formed with aluminum oxide film having a thickness of 5 nm, which is thicker than natural oxide. The symbol "d" used in FIG. 9 represents the thickness of the aluminum oxide. (The same holds true for other figures to be referred to later.)

Subsequently, a barium titanate layer (i.e., third layer 66) is deposited over the second layer 64 in the same manner as with the first layer 62. This barium titanate layer (i.e., third layer 66) has a thickness of about 5 µm, which is the same as the first layer 62 for example.

Thereafter, a paste-like conductive polymer is applied onto the third layer 66 to form the conductive polymer film 54. Further, the paste-like carbon film 56 is applied onto the conductive polymer film 54. Moreover, the silver paste 58 is applied onto the carbon film 56.

Like the deposited film described with reference to FIG. 3, the second layer 64 is a structural body including the Al particles 8 and the dielectric film 14 covering the entire surface of each Al particle 8. The dielectric film 14 includes a continuum comprising the aluminum oxide 10 covering the surface of each Al particle 8, and the barium titanate fine particles 12 dispersed in the continuum.

The dielectric film 14 is very thin (~5 nm). The addition of the barium titanate fine particles 12 causes the dielectric constant of the dielectric film 14 to increase. For this reason, the second layer 64 has a very high effective dielectric constant. As a result, the capacitor film 38, 39, 40 has a very high capacitance density. Accordingly, the capacitor 36 according to the present embodiment in which a plurality of such capacitor films 38, 39, 40 are connected in parallel with each other, has a very high capacitance density.

As described above, the dielectric film 14 separating adjacent Al particles 8 from each other in the second layer 64 is very thin (about 5 nm). For this reason, the second layer 64 is likely to form the current path serving as a leakage current path.

In the capacitor 36 according to the present embodiment, however, the thick barium titanate layer (i.e., first layer 62) which is as thick as about 5 µm is formed between the first electrode 48 and the second layer 64. Further, the barium titanate layer (i.e., second layer 66) having a thickness of about 5 µm is formed between the second electrode 49 and the second layer 64.

These barium titanate layers prevent formation of the current path extending from the first electrode 48 to the second electrode 49. For this reason, the capacitor film 38, 39, 40 exhibits a reduced leakage current. Accordingly, the present capacitor 36 exhibits a reduced leakage current.

Further, variations in leakage current and in withstand voltage are reduced by preventing the formation of the current path, which leads to an improved yield.

FIGS. 10 and 11 are tables providing a summary of data on the capacitors according to the present embodiment and embodiments 2 to 4 to be described later. Table 1 in FIG. 10 provides a summary of data on the capacitors according to embodiments 1 to 3. Table 2 in FIG. 11 provides data on the capacitors according to embodiment 4 and a comparative example to be described later. Table 2 also provides data on other high capacitance capacitors as reference examples 1 to 3.

As can be seen from Table 1, the present capacitor 36 has a capacitance density of 200 µF/cm$^2$ even though the dielectric layer is as thin as about 60 µm. That is, the capacitance density of the present capacitor 36 is substantially equal to that of the conventional electrolytic capacitor. Further, the present capacitor exhibits a withstand voltage of 20 V, which is significantly higher than 5 V.

Table 2 provides the data on the comparative example to be described later which is not provided with the barium titanate layers (i.e., first and third layers 62 and 66) for preventing the formation of the current path. Even when the thickness difference between the dielectric layers is taken into consideration, the withstand voltage of the capacitor according to the present embodiment is far higher than 3 V, which is the value of the withstand voltage of the comparative example.

As can be seen from Table 1, the leakage current of the present capacitor 36 assumes $10^{-7}$ A/cm$^2$ when the capacitor 36 is applied with a voltage of 15 V, which is equivalent to an electric field intensity of 0.25 kV/mm. The leakage current of the capacitor according to the comparative example assumes $10^{-7}$ A/cm$^2$ when the capacitor is applied with a voltage of 2 V, which is equivalent to an electric field intensity of 0.1 kV/mm. That is, the present embodiment exhibits a far lower leakage current than the comparative example not provided with the barium titanate layers (i.e., first and third layers 62 and 66).

Measurement of the withstand voltage and the leakage current was conducted by a process including impregnating the dielectric layer 52 in a state prior to the formation of the second electrode 49 with an aqueous solution of adipic acid and then applying voltage across the first electrode 48 and the aqueous solution.

In the present capacitor 36, the first electrode 48 is formed on a first major surface 65 of the dielectric layer (i.e., structural body) 52, while the second electrode 49 is formed on a second major surface 67 of the dielectric layer (i.e., structural body) 52, as illustrated in FIG. 8. The dielectric layer (i.e., structural body) 52 includes the first dielectric layer (i.e., second layer 64), as illustrated in FIG. 9. The first dielectric layer is formed on the first substrate (i.e., first layer 62) by causing the conductive particles (i.e., Al particles 8) each having a surface entirely covered with the dielectric film (i.e., aluminum oxide 10) to form with the first substrate (i.e., first electrode 48). The first dielectric layer is fixed onto the first substrate (i.e., first layer 62) with its surface remaining entirely covered with the dielectric film (i.e., aluminum oxide 10). The dielectric layer (i.e., structural body) 52 further includes the second dielectric layers (i.e., first and third layers 62 and 66). The second dielectric layers each have a higher dielectric volume ratio than the first dielectric layer (i.e., second layer 64).

The dielectric layer (i.e., structural body) 52 includes the two second dielectric layers. One of the second dielectric layers (i.e., first layer 62) is interposed between the first dielectric layer (i.e., second layer 64) and the first major surface 65. The other second dielectric layer (i.e., third layer 66) is interposed between the first dielectric layer (i.e., second layer 64) and the second major surface 67.

The second dielectric layers (i.e., first and third layers 62 and 66) are each formed on the substrate (i.e., first electrode 48 or second layer 64) by causing the dielectric particles (i.e., barium titanate) to form with the substrate. Therefore, the second dielectric layers are formed entirely of the dielectric.

Figure 12:
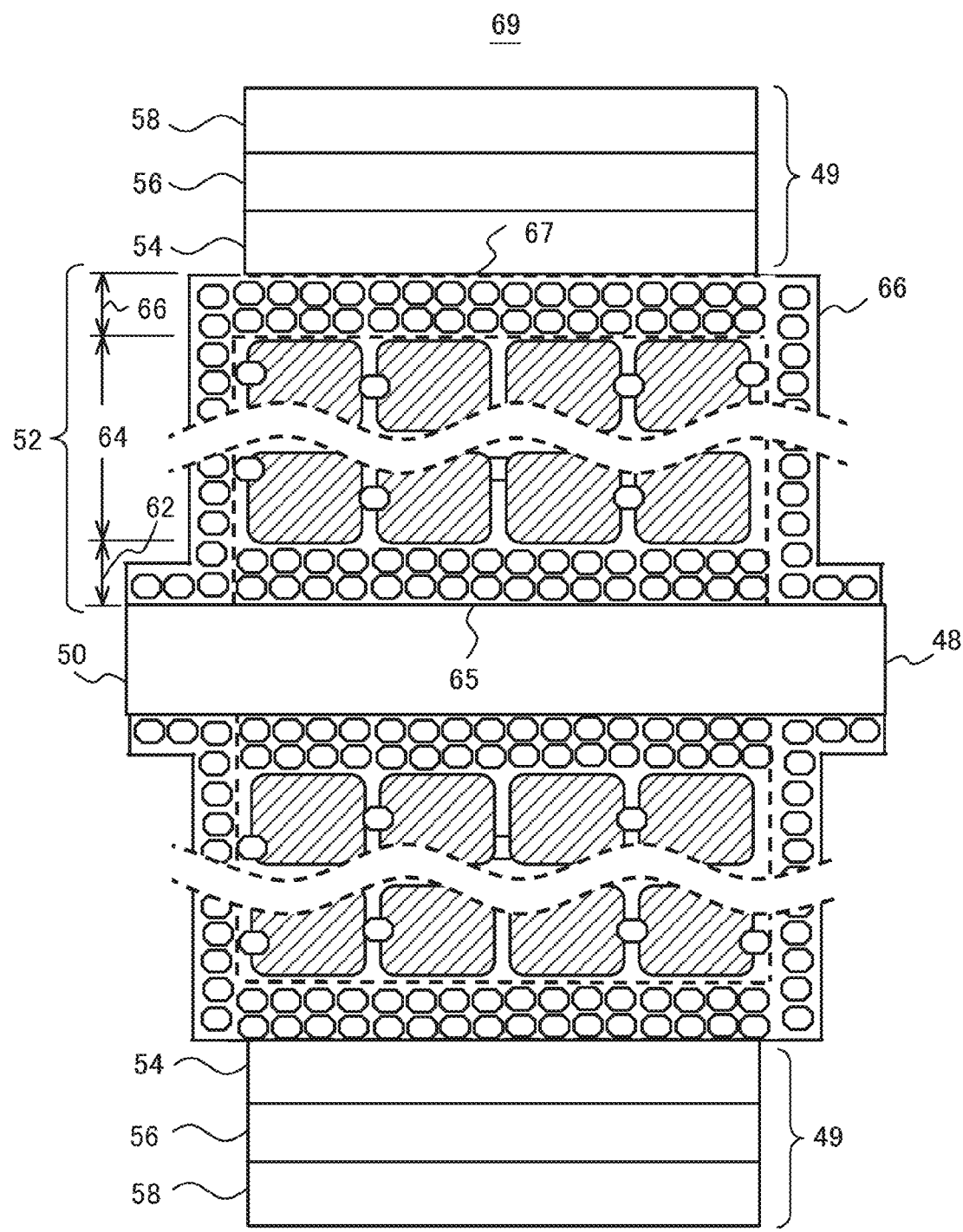
FIG. 12 is a sectional view illustrating a structure of a capacitor film of another type.

FIG. 12 is a sectional view illustrating a structure of a capacitor film 69 of another type.

In the capacitor film 69, the second dielectric layer (i.e., third layer 66) which is located on the second electrode 49 side is extended onto the side surfaces of the first dielectric layer (i.e., second layer 64) and onto a surface of the first electrode 48. Thus, the second dielectric layer (i.e., third layer 66) covers the side surfaces of the dielectric layer 52 and the surface of the first electrode 48.

For this reason, even when the second electrode 49 (including the conductive polymer film 54, carbon film 56 and silver paste 58) extends off the dielectric layer 52, the second electrode 49 fails to be brought into contact with the first electrode 48, thus obviating a short circuit between the first and second electrodes 48 and 49.

Figure 13:
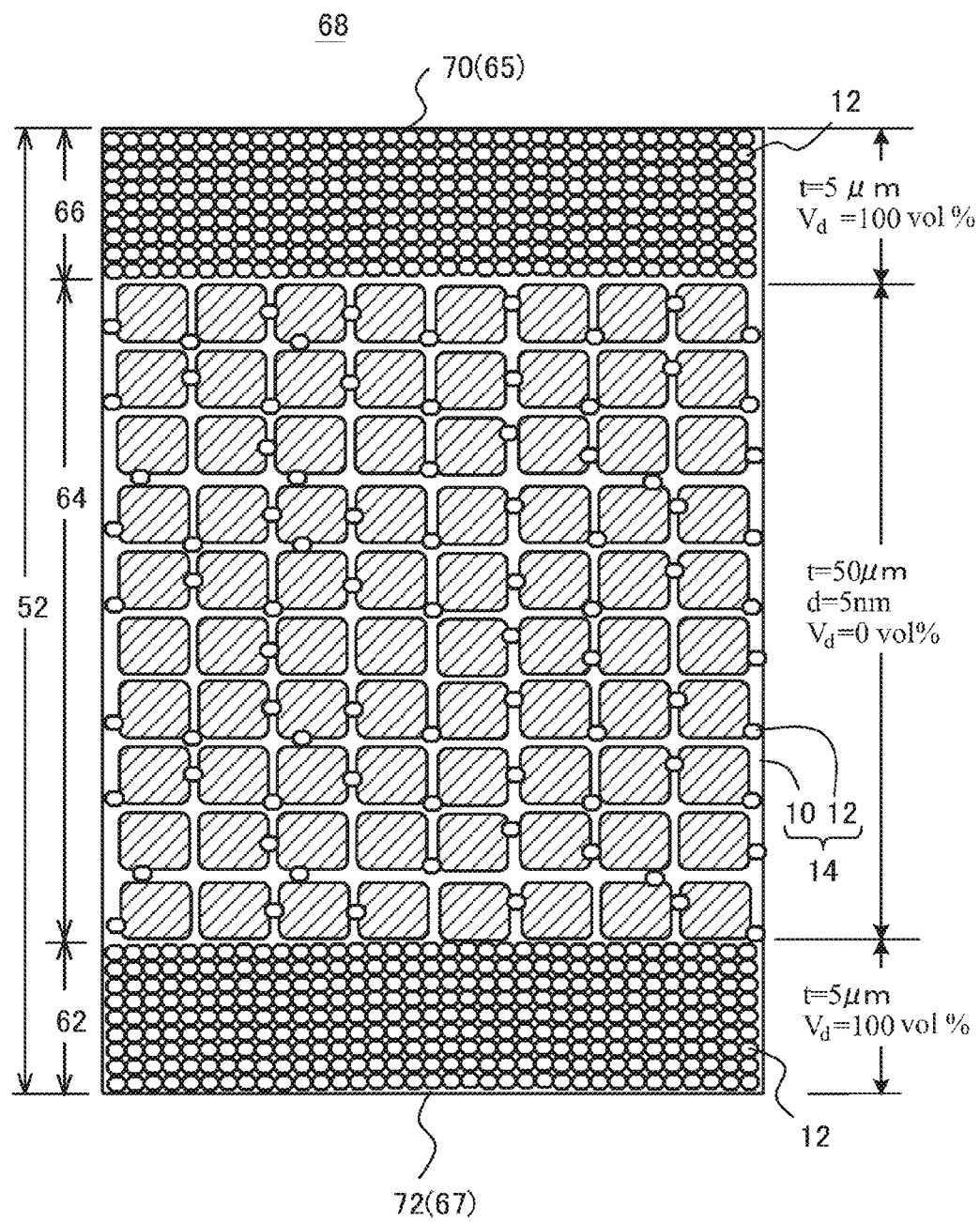
FIG. 13 is a sectional view illustrating a structure of a dielectric layer (i.e., structural body) in a state in which an electrode has been peeled off.

FIG. 13 is a sectional view illustrating a state in which the first electrode 48 has been peeled off from the dielectric layer 52 (i.e., structural body) before being formed with the second electrode 49. The first electrode 48 may be peeled off by wet etching or a like process for example.

A capacitor may be formed by forming the electrodes on upper and lower surfaces 70 and 72 after the formation of such a structural body 68.

(2) Gas Deposition Method

Figure 14:
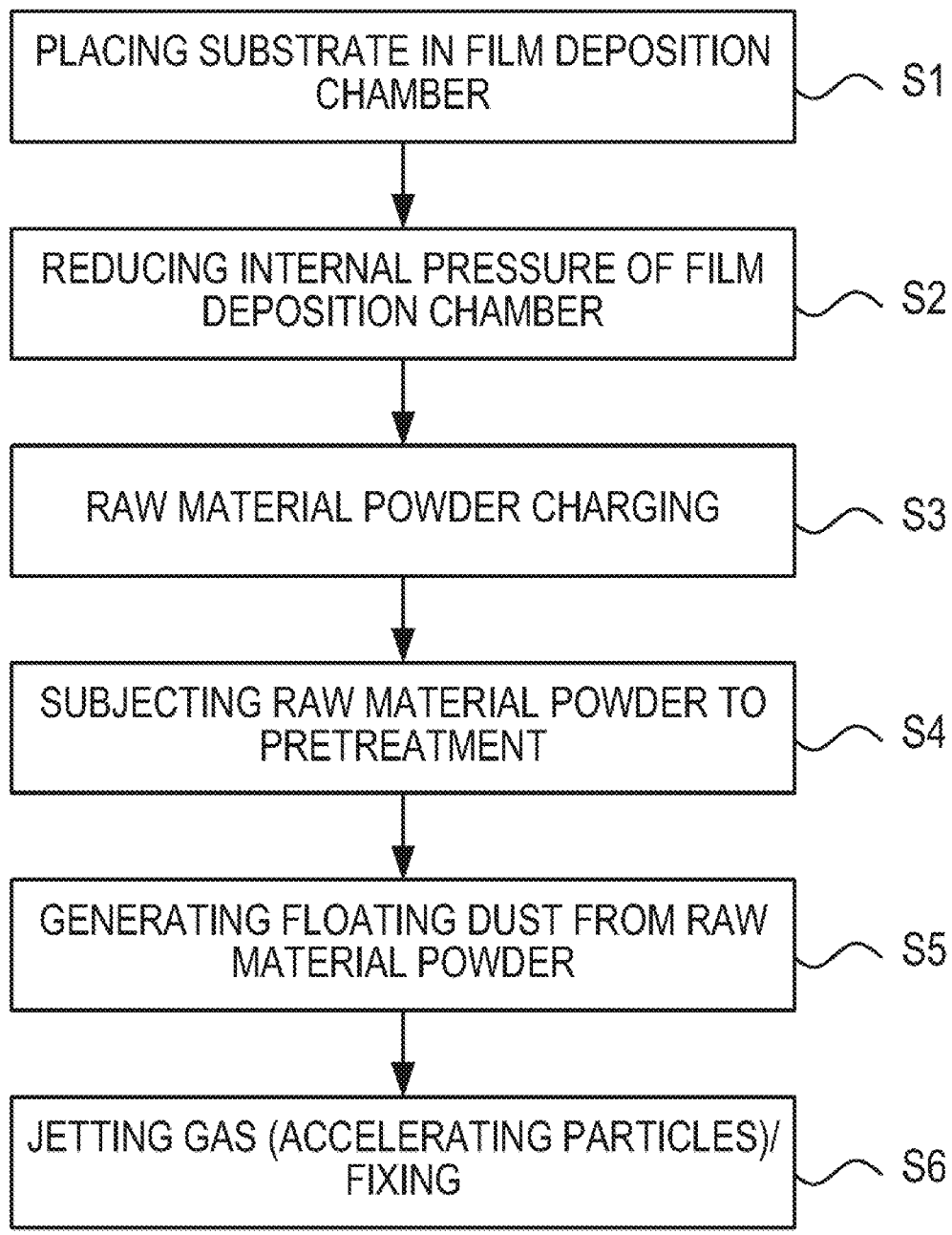
FIG. 14 is a flowchart illustrating procedural steps of the gas deposition method.
Figure 15:
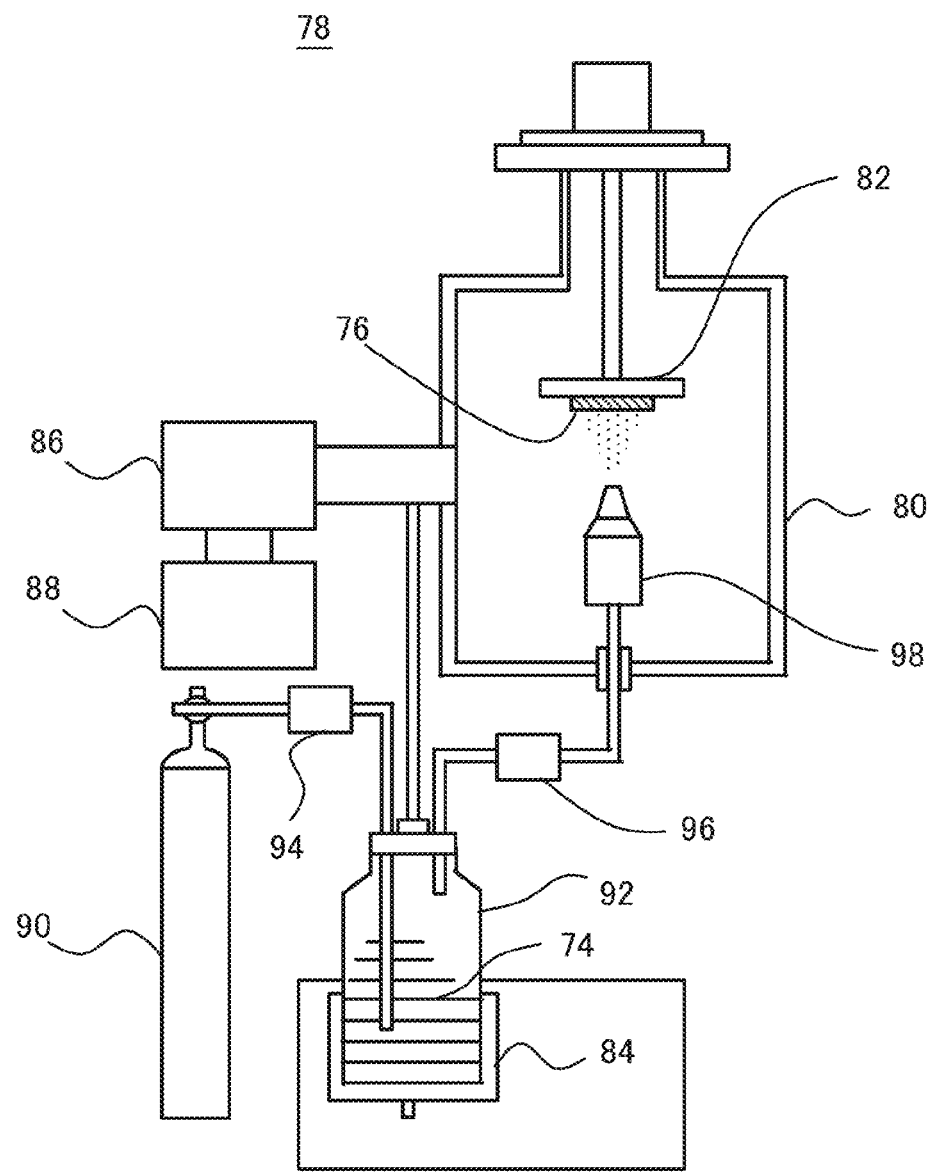
FIG. 15 is a schematic view illustrating a configuration of a film deposition system used in the gas deposition method.

FIG. 14 is a flowchart illustrating procedural steps of the gas deposition method used to form the dielectric layer 52. FIG. 15 is a schematic view illustrating a configuration of a film deposition system used in the gas deposition method.

Initially, a substrate 76 (e.g., aluminum foil 50) is loaded into a film deposition system 78. A film deposition chamber 80 includes a stage 82 which is movable in the X- and Y-directions. The substrate 76 is placed on the stage 82 (Step S1).

Subsequently, the inside of the film deposition chamber 80 is evacuated by means of a mechanical booster pump 86 and a vacuum pump 88 to provide a vacuum therein. By so doing, the internal pressure of the film deposition chamber 80 is reduced to 10 Pa or lower (step S2). At that time, a first valve 94 provided on a gas pipe interconnecting a gas cylinder 90 and a floating dust generating container 92 is closed. A second valve 96 provided on a gas pipe interconnecting the floating dust generating container 92 and the film deposition chamber 80 is also closed.

Subsequently, the floating dust generating container 92 is charged with raw material powder (e.g., barium titanate powder) (step S3).

Subsequently, with the floating dust generating container 92 being entirely applied with ultrasonic wave by an oscillator 84, the raw material powder 74 is heated to about 80° C. and deaerated for 30 minutes under vacuum. At that time, the second valve 96 is opened to evacuate the floating dust generating container 92 to provide vacuum therein. The second valve 96 is closed after the deaeration under vacuum has been completed. By the pretreatment described above, water adsorbed onto the surface of each particle of the raw material powder 74 is removed (step S4).

Subsequently, the first valve 94 is opened to introduce a compressed gas of high-purity helium gas (gas pressure: 2 kg/cm$^2$, gas flow rate: 8 l/min.) into the floating dust generating container 92.

The introduction of the compressed gas causes fine particles forming the raw material powder 74 to be stirred up and start floating in the helium gas. Such fine particles floating in gas are called "floating dust". During the introduction of the gas, the floating dust generating container 92 is still entirely applied with ultrasonic wave by the oscillator 84 to promote floating dust generation. The gas flow rate is measured by a massflow meter (not illustrated) located between the gas cylinder 90 and the floating dust generating container 92 (step S5).

Subsequently, the second valve 96 is opened to feed the raw material powder in the form of floating dust into the film deposition chamber 80 through a nozzle 98. At that time, the raw material powder in the form of floating dust, together with the helium gas, is jetted against the substrate 76 through the nozzle 76. The particles of the raw material powder are accelerated by the jetting. The particles thus accelerated are fixed onto the substrate 76 by collision with the substrate 76 (step S6).

A layer in contact with the substrate 76 (e.g., first layer 62) is formed by the steps described above.

In cases where layers having different structures (e.g., second layer 64, third layer 66 and the like) are stacked on each other, different types of raw material powder prepared for the respective layer structures are provided and then the process from the raw material powder charging (step S3) to the gas jetting/fixing (step S6) is carried out.

(3) Fabrication Method

As apparent from the foregoing description, the features of the method of fabricating the present capacitor 40 are as follows.

According to the present fabrication method, first powder comprising a bonding structure of particles (i.e., barium titanate particles) each having a surface entirely formed of a dielectric (i.e., barium titanate), together with a gas, is jetted and accelerated so as to form with the first substrate (i.e., aluminum foil 50). By so doing, the particles (i.e., barium titanate particles) are fixed onto the first substrate (i.e., aluminum foil 50) with their respective surfaces each remaining entirely formed of the dielectric. As a result, the first layer 62 is formed (see FIG. 9).

According to the present fabrication method, a second powder comprising a bonding structure of conductive particles (i.e., Al particles) each having a surface entirely covered with a dielectric film (i.e., aluminum oxide), together with the gas, is jetted and accelerated so as to form with the second substrate (i.e., first layer 62). By so doing, the particles (i.e., Al particles) are fixed onto the second substrate (i.e., first layer 62) with their respective surfaces each remaining entirely covered with the dielectric (see FIG. 9). As a result, the second layer 64 is formed.

Further, according to the present fabrication method, another first layer 62 is formed after the formation of the second layer 64. In this case, the substrate with which the aforementioned particles (i.e., barium titanate particles) form is the second layer 64. By so doing, the third layer 66 is formed.

Further, according to the present fabrication method, the structural body (i.e., dielectric layer 52) comprising the aforementioned particles (i.e., barium titanate particles) thus fixed and the aforementioned conductive particles (i.e., Al particles) thus fixed, is sandwiched between the electrodes.

The present fabrication method is a method of fabricating a capacitor in which the ratio of the volume of the dielectric portion (i.e., barium titanate) to the total volume of the particles forming the first powder is higher than the ratio of the volume of the dielectric portion (i.e., barium titanate and aluminum oxide) to the total volume of the particles forming the second powder.

Stated otherwise, the present fabrication method includes jetting the first powder comprising plural particles (i.e., barium titanate particles) each having a surface entirely formed of the first dielectric (i.e., barium titanate), together with the gas, to cause the particles to form with the first substrate (i.e., aluminum foil 50). By so doing, the particles are fixed onto the first substrate with their respective surfaces each remaining entirely formed of the first dielectric.

The present fabrication method includes jetting the second powder comprising plural conductive particles (i.e., Al particles) each having a surface entirely covered with the second dielectric (i.e., aluminum oxide), together with the gas, to cause the conductive particles to collide with the second substrate (i.e., first layer 62). By so doing, the conductive particles are fixed onto the second substrate with their respective surfaces each remaining entirely covered with the second dielectric.

The present fabrication method further includes sandwiching the structural body comprising the particles (i.e., barium titanate particles) thus fixed onto the first substrate and the conductive particles (i.e., Al particles) thus fixed onto the second substrate between the electrodes. In the capacitor fabricated by the present fabrication method, the ratio of the volume of the first dielectric to the total volume of the particles included in the first powder is higher than the ratio of the volume of the first and second dielectrics to the total volume of the particles included in the second powder.

Embodiment 2

Figure 16:
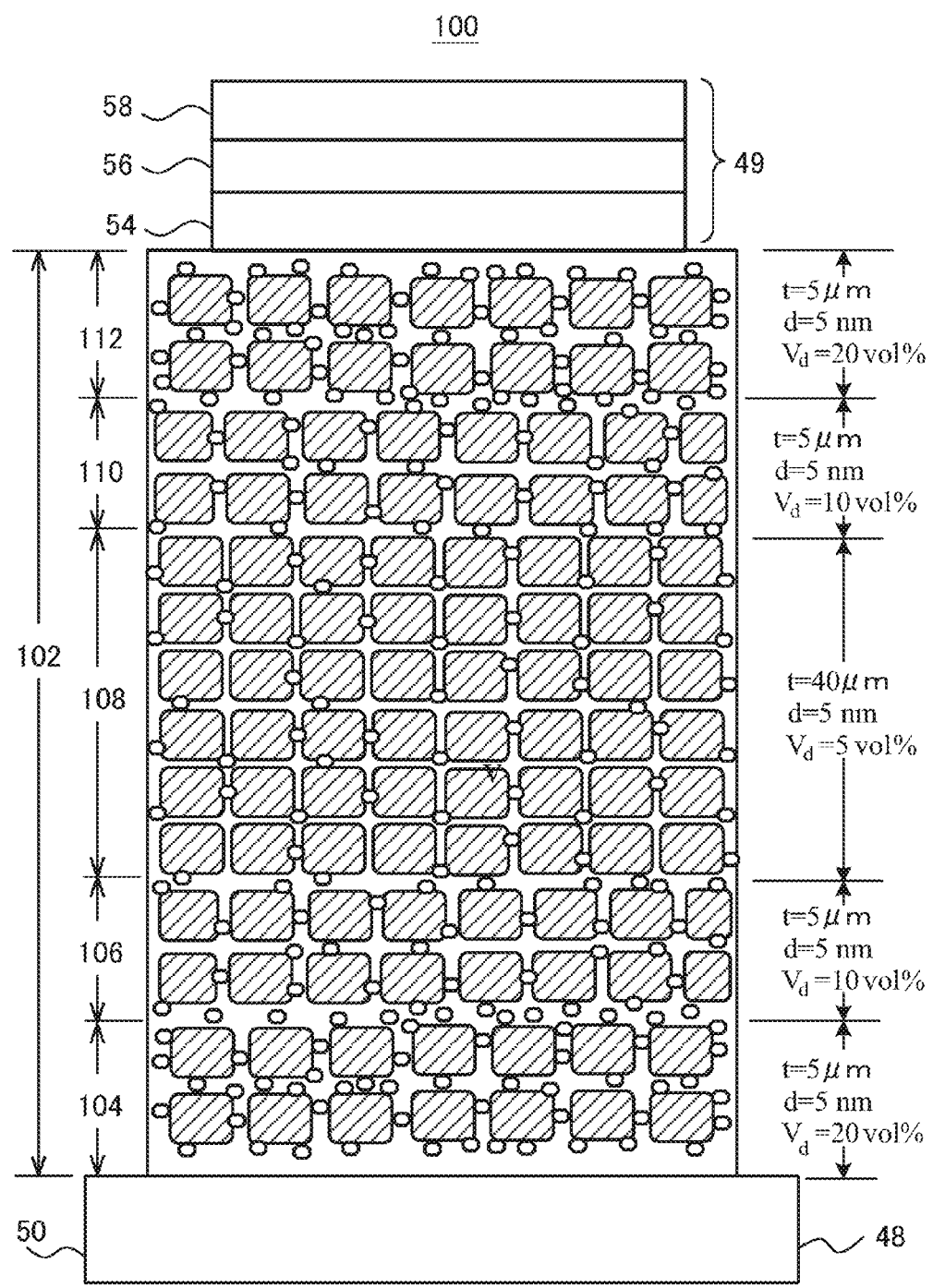
FIG. 16 is a sectional view illustrating a structure of an upper half of a capacitor film of an additional embodiment (embodiment 2)

Like the capacitor according to embodiment 1, a capacitor according to the present embodiment includes stacked capacitor films. FIG. 16 is a sectional view illustrating a structure of an upper half of a capacitor film 100.

The capacitor film 100 is formed using the aluminum foil 50 as a substrate (see FIG. 16). On opposite sides of the aluminum foil 50 there are formed dielectric layers 102 by the gas deposition method. That dielectric layer 102 which is formed on the underside of the aluminum foil 50 is not illustrated in FIG. 16. The meanings of the symbols "t", "d" and "Vd" used in FIG. 16 are each the same as the meaning of a respective one of the symbols used in FIG. 9.

Description will be made of the structure of the capacitor film 100 in accordance with a fabrication method thereof.

Initially, a deposited film (i.e., first layer 104) having a thickness of about 5 μm is formed over the aluminum foil 50 having a thickness of about 50 μm by the gas deposition method. The raw material powder used is mixed powder prepared by adding about 20 vol % (volume ratio) of barium titanate particles to powder comprising a bonding structure of surface-oxidized aluminum particles. The surface oxidation is the same treatment as the surface oxidation conducted on the aluminum particles used in embodiment 1. The same holds true for the following procedural steps.

The average particle diameter of the aluminum particles is 3 μm±1 μm. The aluminum oxide covering the surface of each aluminum particle has a thickness of about 5 nm. The average particle diameter of the barium titanate particles is about 50 nm. Aluminum particles and barium titanate particles forming mixed powder to be used in the following steps are identical in structure with the aluminum particles and barium titanate particles described in this paragraph.

Subsequently, a deposited film (i.e., second layer 106) having a thickness of about 5 μm is formed over the first layer 104 by the gas deposition method. The raw material powder used here is mixed powder prepared by adding about 10 vol % (volume ratio) of barium titanate particles to powder comprising a bonding structure of surface-oxidized aluminum particles.

Subsequently, a deposited film (i.e., third layer 108) having a thickness of about 40 μm is formed over the second layer 106 by the gas deposition method. The raw material powder used here is mixed powder prepared by adding about 5 vol % (volume ratio) of barium titanate particles to powder comprising a bonding structure of surface-oxidized aluminum particles.

Subsequently, a deposited film (i.e., fourth layer 110) having a thickness of about 5 μm is formed over the third layer 108 by the gas deposition method. The raw material powder used here is mixed powder prepared by adding about 10 vol % (volume ratio) of barium titanate particles to powder comprising a bonding structure of surface-oxidized aluminum particles.

Subsequently, a deposited film (i.e., fifth layer 112) having a thickness of about 5 μm is formed over the fourth layer 110 by the gas deposition method. The raw material powder used here is mixed powder prepared by adding about 20 vol % (volume ratio) of barium titanate particles to powder comprising a bonding structure of surface-oxidized aluminum particles.

Subsequently, a paste-like conductive polymer is applied onto the deposited film (i.e., fifth layer 112) to form the conductive polymer film 54. Further, paste-like carbon is applied onto the conductive polymer film 54 to form the carbon film 56. Subsequently, the silver paste 58 is applied onto the carbon film 56.

As apparent from the foregoing description, the method of fabricating the capacitor 100 according to the present embodiment includes causing the conductive particles (i.e., aluminum particles) each having a surface entirely covered with the dielectric film (i.e., aluminum oxide film) to collide with the substrate (i.e., aluminum foil 50 or fourth layer 110), thereby forming the second dielectric layers (i.e., first layer 104 and fifth layer 112). Each of the second dielectric layers thus formed has the conductive particles which are fixed onto the substrate with their respective surfaces each remaining entirely covered with the dielectric film (i.e., aluminum oxide).

That is, the second dielectric layers (i.e., first layer 104 and fifth layer 112) each include plural conductive particles (i.e., aluminum particles) each having a surface entirely covered with the dielectric film (i.e., aluminum oxide film). The plural conductive particles (i.e., aluminum particles) are isolated from each other by the dielectric film (i.e., aluminum oxide film).

Dielectric particles (i.e., barium titanate particles) are present between adjacent conductive particles. The second dielectric layers (i.e., first layer 104 and fifth layer 112) each have a higher volume ratio of dielectric particles than the first dielectric layer (i.e., third layer 108).

The third layer 108 has substantially the same structure as the deposited film described with reference to FIG. 3. For this reason, the third layer 108 has a very high effective dielectric constant. Therefore, the capacitor film 100 has a very high capacitance density. Accordingly, the capacitor according to the present embodiment has a very high capacitance density.

The first layer 104 in contact with the first electrode 48 is incorporated with a large amount of barium titanate. That is, the first layer 104 has a high dielectric volume ratio. Therefore, the first layer 104 has a thick dielectric film separating the conductive particles (i.e., Al particles) from each other.

Likewise, the fifth layer 112 in contact with the second electrode 49 is incorporated with a large amount of barium titanate. That is, the fifth layer 112 also has a high dielectric volume ratio. Therefore, the fifth layer 112 also has a thick dielectric film separating the conductive particles (i.e., Al particles) from each other.

Therefore, the capacitor according to the present embodiment prevents formation of the current path by the first and fifth layers 104 and 112. Thus, the formation of the current path is difficult. Accordingly, the capacitor according to the present embodiment exhibits a reduced leakage current. Since the formation of the current path is difficult, variations in leakage current and in withstand voltage are reduced, which leads to an improved yield.

The second layer 106 and the fourth layer 110 are buffer layers provided for preventing the dielectric volume ratio from changing abruptly. The provision of such buffer layers enhances the adhesion between the first and third layers 104 and 108 and between the third and fifth layers 108 and 112.

Table 1 (in FIG. 10) describes characteristics of the present capacitor.

As can be seen from Table 1, the present capacitor has a capacitance density of 300 μF/cm$^2$, which is higher than the capacitance density (200 μF/cm$^2$) of the electrolytic capacitor (see FIGS. 10 and 11). Further, the present capacitor exhibits a withstand voltage of 10 V, which is significantly higher than 5 V which allows the capacitor to be put to practical use.

Table 2 (in FIG. 11) provides the data on the comparative example which is not provided with the layers (i.e., first and fifth layers 104 and 112) for preventing the formation of the current path. Even when the thickness difference between the dielectric layers is taken into consideration, the withstand voltage of the capacitor according to the present embodiment is higher than that of the comparative example.

As can be seen from Table 1, the leakage current of the present capacitor assumes $10^{-7}$ A/cm$^2$ when the capacitor is applied with a voltage of 15 V, which is equivalent to an electric field intensity of 0.25 kV/mm. The leakage current of the capacitor according to the comparative example assumes $10^{-7}$ A/cm$^2$ when the capacitor is applied with a voltage of 2 V, which is equivalent to an electric field intensity of 0.1 kV/mm. That is, the present embodiment exhibits a far lower leakage current than the comparative example not provided with the layers (i.e., first and fifth layers 104 and 112) for preventing the formation of the current path.

Figure 17:
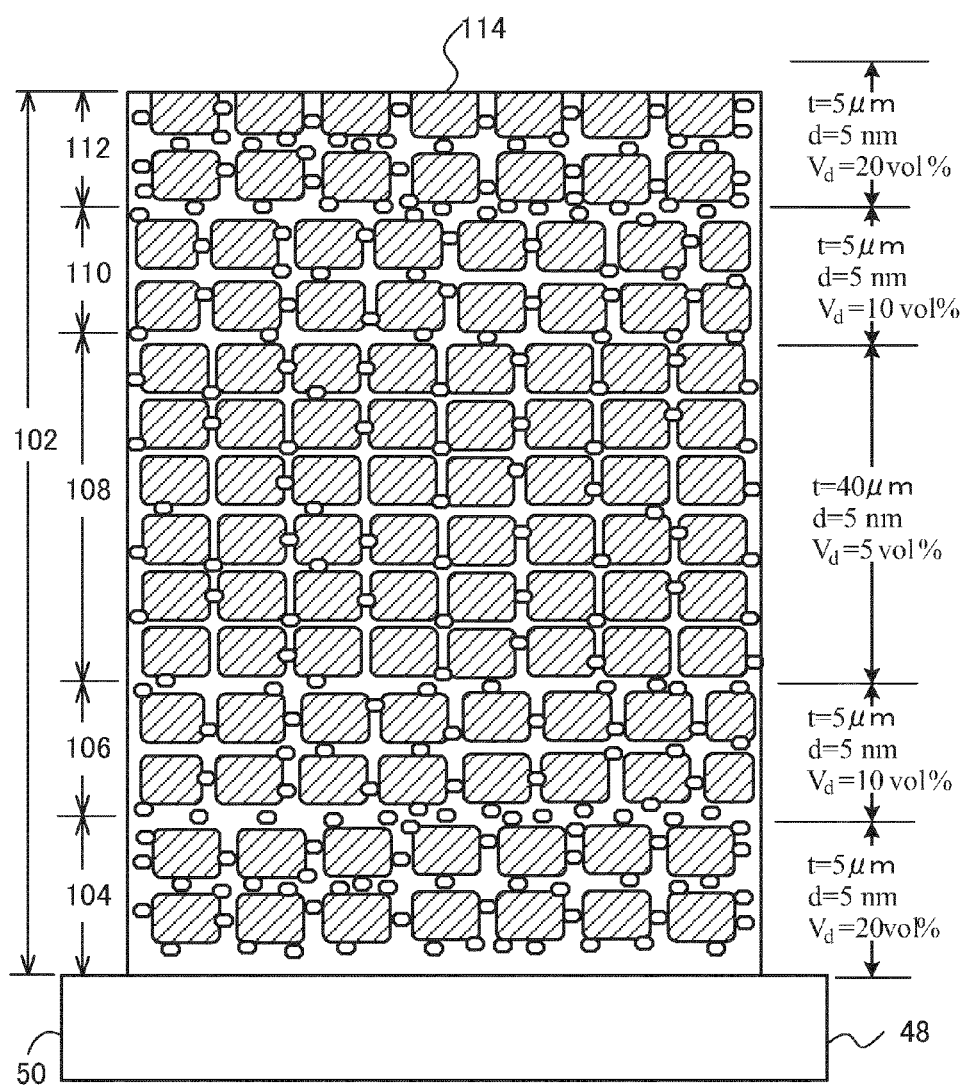
FIG. 17 is a sectional view illustrating a dielectric layer in a state in which a surface thereof has been polished.

FIG. 17 is a view illustrating the dielectric layer 102 in a state in which a surface thereof has been polished. By forming the second electrode 49 on a polished surface 114 after the surface of the dielectric layer 102 has been thus polished, the resulting capacitor has an increased capacitance.

This is because the oxide film covering the outermost surface of the dielectric layer 102 has been removed. That dielectric layer which is formed on the underside of the aluminum foil 50 is not illustrated in FIG. 17. In each of the embodiments to be described below, it is also possible to increase the capacitance of a capacitor by forming the second electrode 49 after a surface of the dielectric layer has been polished in the same manner as above.

The dielectric layer 102 may be polished using any one of processes such as mechanical polishing, electrolytic polishing, CMP (chemical mechanical polishing), and ion milling.

Figure 18:
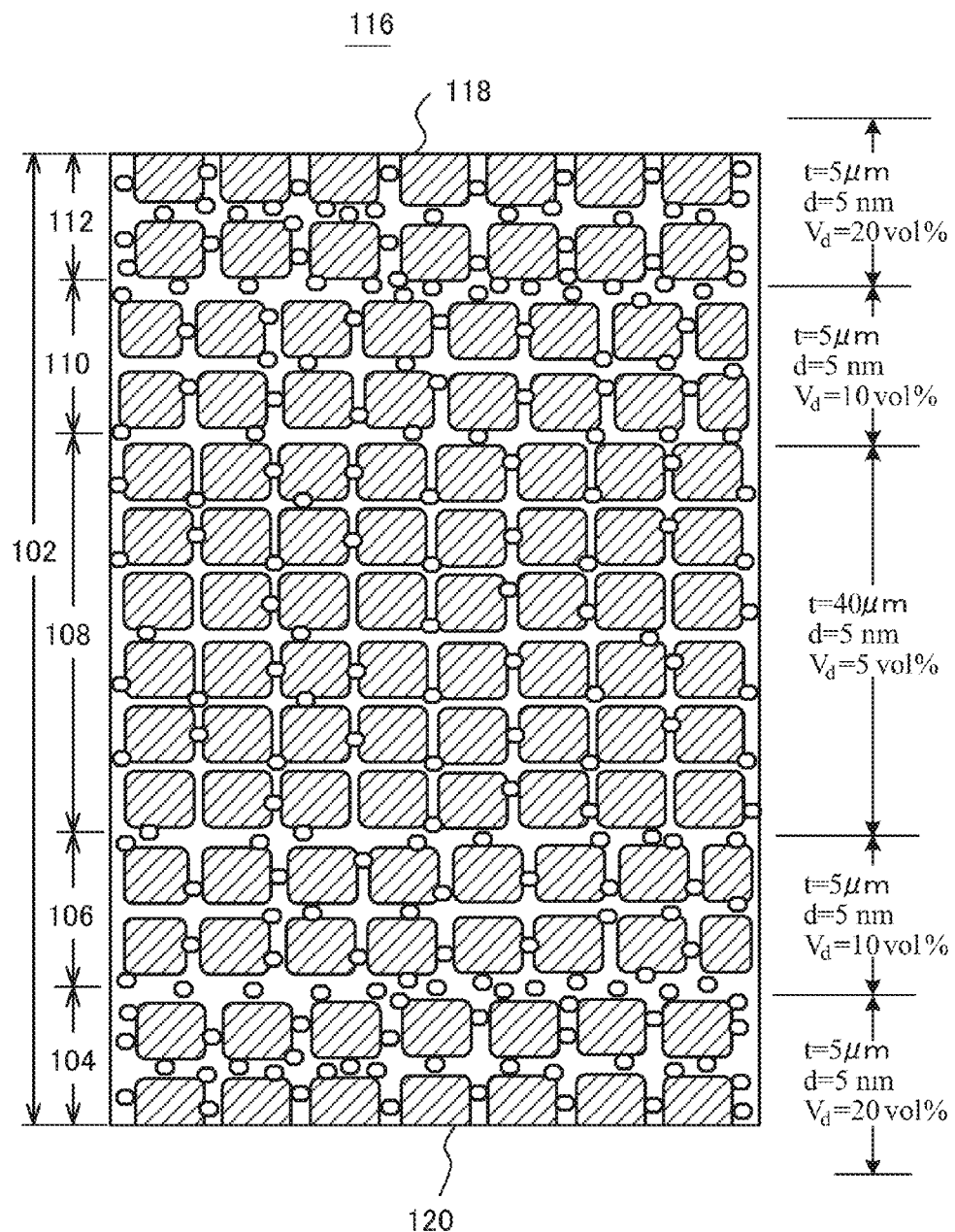
FIG. 18 is a sectional view illustrating a structural body peeled off from an aluminum foil, in a state in which respective upper and lower surfaces thereof have been polished.

FIG. 18 is a view illustrating a structural body (i.e., dielectric layer 102) peeled off from the aluminum foil 50, in a state in which respective upper and lower surfaces thereof have been polished for about 500 nm. It is possible to fabricate a capacitor by forming electrodes on the respective upper and lower polished surfaces 118 and 120 of a structural body 116 thus formed. In each of the following embodiments, it is also possible to fabricate a capacitor by polishing upper and lower surfaces of a structural body having been peeled off from the aluminum foil and then forming electrodes on the respective polished surfaces of the structural body in the same manner as above.

Embodiment 3

Figure 19:
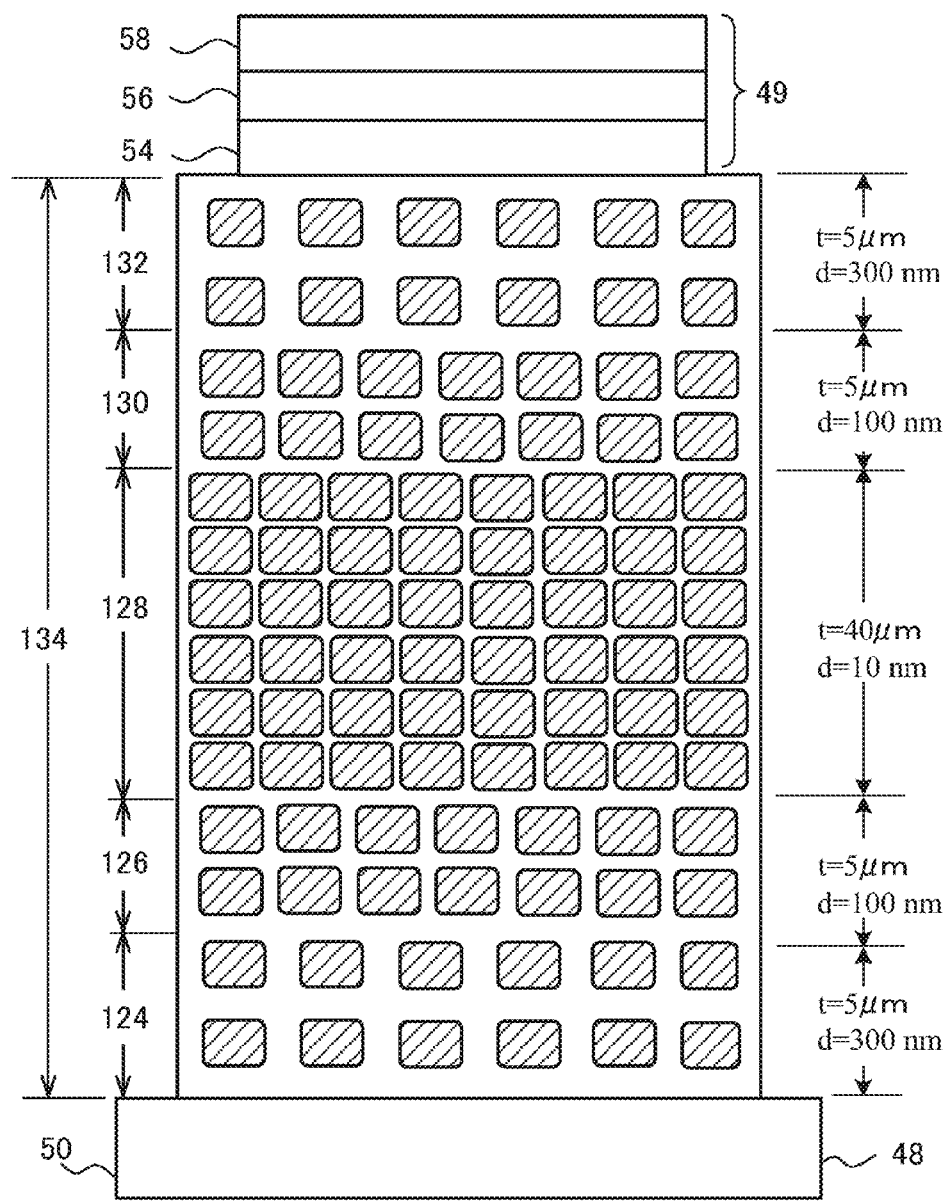
FIG. 19 is a sectional view illustrating a structure of an upper half of a capacitor film of an additional embodiment (embodiment 3)

Like the capacitor according to embodiment 1, a capacitor according to the present embodiment includes stacked capacitor films. FIG. 19 is a sectional view illustrating a structure of an upper half of a capacitor film 122.

The capacitor film 122 is formed using the aluminum foil 50 as a substrate (see FIG. 19). On opposite sides of the aluminum foil 50 there are formed dielectric layers 134 by the gas deposition method. That dielectric layer 134 which is formed on the underside of the aluminum foil 50 is not illustrated in FIG. 19. The meanings of the symbols "t", "d" and "Vd" used in FIG. 19 are each the same as the meaning of a respective one of the symbols used in FIG. 9.

Description will be made of the structure of the capacitor film 122 in accordance with a fabrication method thereof.

Initially, a deposited film (i.e., first layer 124) having a thickness of about 5 μm is formed over the aluminum foil 50 having a thickness of about 50 μm by the gas deposition method. The raw material powder used is powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 300 nm. The aluminum oxide covering the surface of each aluminum particle is formed by a sol-gel process. The aluminum oxide covering the surface of each particle of powder to be used in the following steps is also formed by the sol-gel process.

Subsequently, a deposited film (i.e., second layer 126) having a thickness of about 5 μm is formed over the first layer 124 by the gas deposition method. The raw material powder used here is powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 100 nm.

Subsequently, a deposited film (i.e., third layer 128) having a thickness of about 40 μm is formed over the second layer 126 by the gas deposition method. The raw material powder used here is powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 10 nm.

Subsequently, a deposited film (i.e., fourth layer 130) having a thickness of about 5 μm is formed over the third layer 128 by the gas deposition method. The raw material powder used here is powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 100 nm.

Subsequently, a deposited film (i.e., fifth layer 132) having a thickness of about 5 μm is formed over the fourth layer 130 by the gas deposition method. The raw material powder used here is powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 300 nm.

Subsequently, a paste-like conductive polymer is applied onto the deposited film (i.e., fifth layer 132) to form the conductive polymer film 54. Further, paste-like carbon is applied onto the conductive polymer film 54 to form the carbon film 56. Subsequently, the silver paste 58 is applied onto the carbon film 56.

As described above, in a capacitor according to the present embodiment, the thickness of the dielectric film (i.e., aluminum oxide film) covering the surface of each conductive particle (i.e., aluminum particle) forming the second dielectric layers (i.e., first layer 124 and fifth layer 132) is larger than that of the dielectric film covering the surface of each conductive particle (i.e., aluminum particle) forming the first dielectric layer (i.e., third layer 128).

The third layer 128 has substantially the same structure as the deposited film described with reference to FIG. 1. For this reason, the third layer 128 has a very high effective dielectric constant. Therefore, the capacitor film 122 has a very high capacitance density. Accordingly, the capacitor according to the present embodiment has a very high capacitance density.

The aluminum oxide covering the surface of each Al particle in the first layer 124 in contact with the first electrode 48 is thicker than the aluminum oxide covering the surface of each Al particle in the third layer 128. As a result, the first layer 124 has a higher dielectric volume ratio.

Likewise, the aluminum oxide covering the surface of each Al particle in the fifth layer 132 in contact with the second electrode 49 is thicker than the aluminum oxide covering the surface of each Al particle in the third layer 128.

Therefore, the formation of the current path is difficult in the capacitor according to the present embodiment. Accordingly, the capacitor according to the present embodiment exhibits a reduced leakage current. Further, variations in leakage current and in withstand voltage are reduced, which leads to an improved yield.

The second layer 126 and the fourth layer 130 are buffer layers provided for preventing the dielectric volume ratio from changing abruptly. The provision of such buffer layers enhances the adhesion between the first and third layers 124 and 128 and between the third and fifth layers 128 and 132.

Table 1 (in FIG. 10) describes characteristics of the present capacitor.

As can be seen from Table 1, the present capacitor has a capacitance density of 300 μF/cm², which is higher than the capacitance density (200 μF/cm²) of the electrolytic capacitor (see FIGS. 10 and 11). Further, the present capacitor exhibits a withstand voltage of 10 V, which is significantly higher than 5 V which allows the capacitor to be put to practical use.

Table 2 provides the data on the comparative example which is not provided with the layers (i.e., first and fifth layers 124 and 132) for preventing the formation of the current path. Even when the thickness difference between the dielectric layers is taken into consideration, the withstand voltage of the capacitor according to the present embodiment is higher than that of the comparative example.

As can be seen from Table 1, the leakage current of the present capacitor assumes $10^{-7}$ A/cm² when the capacitor is applied with a voltage of 15 V, which is equivalent to an electric field intensity of 0.25 kV/mm. The leakage current of the capacitor according to the comparative example assumes $10^{-7}$ A/cm² when the capacitor is applied with a voltage of 2 V, which is equivalent to an electric field intensity of 0.1 kV/mm. That is, the present embodiment exhibits a far lower leakage current than the comparative example not provided with the layers (i.e., first and fifth layers 124 and 132) for preventing the formation of the current path.

Embodiment 4

Figure 20:
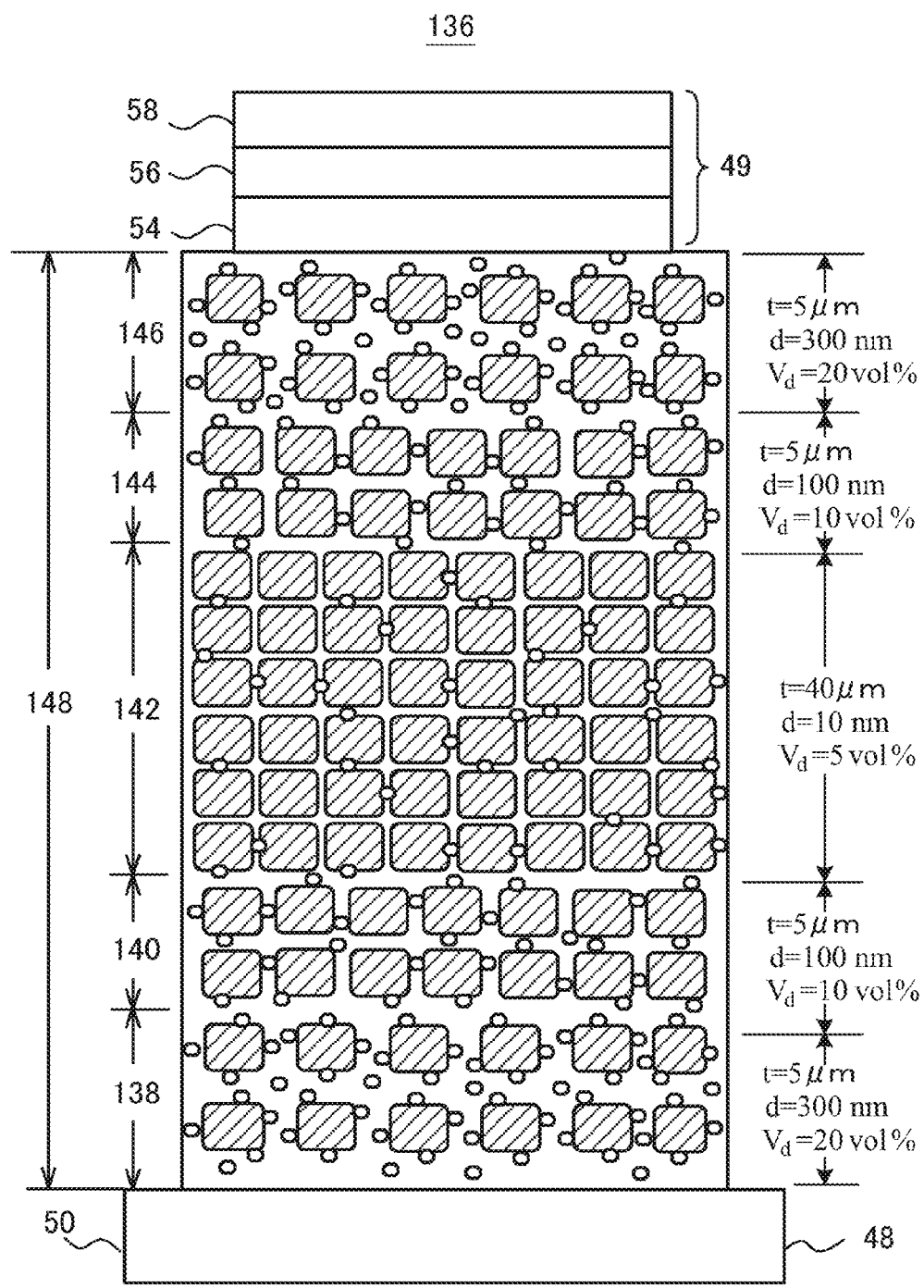
FIG. 20 is a sectional view illustrating a structure of an upper half of a capacitor film of an additional embodiment (embodiment 4).

Like the capacitor according to embodiment 1, a capacitor according to the present embodiment includes stacked capacitor films. FIG. 20 is a sectional view illustrating a structure of an upper half of a capacitor film 136.

The capacitor film 136 is formed using the aluminum foil 50 as a substrate (see FIG. 20). On opposite sides of the aluminum foil 50 there are formed dielectric layers 148 by the gas deposition method. As in FIG. 9, that dielectric layer 148 which is formed on the underside of the aluminum foil 50 is not illustrated in FIG. 20. The meanings of the symbols "t", "d" and "Vd" used in FIG. 20 are each the same as the meaning of a respective one of the symbols used in FIG. 9.

Description will be made of the structure of the capacitor film 136 in accordance with a fabrication method thereof.

Initially, a deposited film (i.e., first layer 138) having a thickness of about 5 μm is formed over the aluminum foil 50 having a thickness of about 50 μm by the gas deposition method.

The raw material powder used is mixed powder prepared by adding about 20 vol % (volume ratio) of barium titanate particles to powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 300 nm. The aluminum oxide covering the surface of each aluminum particle is formed by the sol-gel process. The aluminum oxide covering the surface of each particle of powder to be used in the following steps is also formed by the sol-gel process.

The average particle diameter of the barium titanate particles is about 50 nm. Such barium titanate particles are mixed into raw material powder in the following steps also. In this case also, the barium titanate particles have an average particle diameter of about 50 nm.

Subsequently, a deposited film (i.e., second layer 140) having a thickness of about 5 μm is formed over the first layer 138 by the gas deposition method.

The raw material powder used here is mixed powder prepared by adding about 10 vol % (volume ratio) of barium titanate particles to powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 100 nm.

Subsequently, a deposited film (i.e., third layer 142) having a thickness of about 40 μm is formed over the second layer 140 by the gas deposition method. The raw material powder used here is mixed powder prepared by adding about 5 vol % (volume ratio) of barium titanate particles to powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 10 nm.

Subsequently, a deposited film (i.e., fourth layer 144) having a thickness of about 5 μm is formed over the third layer 142 by the gas deposition method. The raw material powder used here is mixed powder prepared by adding about 10 vol % (volume ratio) of barium titanate particles to powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 100 nm.

Subsequently, a deposited film (i.e., fifth layer 146) having a thickness of about 5 μm is formed over the fourth layer 144 by the gas deposition method. The raw material powder used here is mixed powder prepared by adding about 20 vol % (volume ratio) of barium titanate particles to powder comprising a bonding structure of aluminum particles each having a surface entirely covered with aluminum oxide.

The average particle diameter of the aluminum particles is 3 μm±1 μm. The aluminum oxide covering the surface of each aluminum particle has a thickness of about 300 nm.

Subsequently, a paste-like conductive polymer is applied onto the deposited film (i.e., fifth layer 146) to form the conductive polymer film 54. Further, paste-like carbon is applied onto the conductive polymer film 54 to form the carbon film 56. Subsequently, the silver paste 58 is applied onto the carbon film 56.

The third layer 142 has substantially the same structure as the deposited film described with reference to FIG. 3. For this reason, the third layer 142 has a very high effective dielectric constant. Therefore, the capacitor film 136 has a very high capacitance density. Accordingly, the capacitor according to the present embodiment has a very high capacitance density.

In the first layer 138 in contact with the first electrode 48, the aluminum oxide covering the surface of each aluminum particle is thick. Further, the first layer 138 is incorporated with a large amount of barium titanate. Therefore, the first layer 138 has an increased volume ratio of the dielectrics (i.e., aluminum oxide and barium titanate). As a result, the first layer 138 has a thick dielectric film separating the conductive particles (i.e., Al particles) from each other.

Likewise, the aluminum oxide covering the surface of each Al particle is thick in the fifth layer 146 in contact with the second electrode 49. Further, the fifth layer 146 in contact with the second electrode 49 is incorporated with a large amount of barium titanate. Therefore, the fifth layer 146 also has an increased dielectric volume ratio. As a result, the fifth layer 146 also has a thick dielectric film separating the conductive particles (i.e., Al particles) from each other.

Therefore, the capacitor according to the present embodiment also prevents the formation of the current path by the first and fifth layers 138 and 146. Thus, the formation of the current path is difficult. Accordingly, the capacitor according to the present embodiment exhibits a reduced leakage current. Further, variations in leakage current and in withstand voltage are reduced, which leads to an improved yield.

Table 2 (in FIG. 11) describes characteristics of the present capacitor.

As can be seen from Table 2, the present capacitor has a capacitance density of 600 µF/cm$^2$, which is significantly higher than the capacitance density (200 µF/cm$^2$) of the electrolytic capacitor even when the thickness difference between the dielectric layers is taken into consideration. Further, the present capacitor exhibits a withstand voltage of 10 V, which is significantly higher than 5 V which allows the capacitor to be put to practical use.

Table 2 provides the data on the comparative example which is not provided with the layers (i.e., first and fifth layers 138 and 146) for preventing the formation of the current path. Even when the thickness difference between the dielectric layers is taken into consideration, the withstand voltage of the capacitor according to the present embodiment is higher than that of the comparative example.

As can be seen from Table 2, the leakage current of the present capacitor assumes $10^{-7}$ A/cm$^2$ when the capacitor is applied with a voltage of 15 V, which is equivalent to an electric field intensity of 0.25 kV/mm. The leakage current of the capacitor according to the comparative example assumes $10^{-7}$ A/cm$^2$ when the capacitor is applied with a voltage of 2 V, which is equivalent to an electric field intensity of 0.1 kV/mm. That is, the present embodiment exhibits a far lower leakage current than the comparative example not provided with the layers (i.e., first and fifth layers 138 and 146) for preventing the formation of the current path.

(Variations)

In any one of the foregoing embodiments, the dielectric layers are formed on the aluminum foil. However, it is possible to form a capacitor by depositing a dielectric film on a printed board having a copper foil affixed thereto or inside a resin build-up substrate by the gas deposition method.

In any one of the foregoing embodiments, each of the dielectric layers is not subjected to a special treatment after having been deposited. However, the dielectric layers may be subjected to laser irradiation (by a CO$_2$ laser having an output power of 10 W or a YVO4 laser). When subjected to such laser irradiation, each dielectric layer becomes densified and hence has a further improved capacitance.

Alternatively, each of the dielectric layers having been deposited may be subjected to a chemical conversion treatment for about 15 minutes by being applied with d.c. voltage in an aqueous solution of ammonal adipate. By so doing, a chemical conversion film is formed over the entire surface of each dielectric layer, thus resulting in a further improved withstand voltage. The value of voltage used in the chemical conversion treatment and the treatment time are, for example, 15 V and 15 minutes, respectively.

In any one of the foregoing embodiments, the conductive particles contained in the raw material powder are aluminum particles. However, such conductive particles may be particles of a valve metal other than aluminum, such as titanium, tantalum, zirconium, silicon, or magnesium. Alternatively, the conductive particles contained in the raw material powder may be particles of an alloy containing such a valve metal as an ingredient.

The dielectric covering these conductive particles may be selected from various dielectrics including tantalum oxide, titanium oxide, zirconium oxide, hafnium oxide, silicon dioxide, silicon nitride, aluminum nitride, tantalum nitride, and magnesium oxide.

The same holds true for the dielectric particles which are mixed with the conductive particles each covered with the dielectric to form raw material powder. The dielectric particles preferably have a higher relative permittivity than the oxide of the conductive particles. Preferably, the dielectric particles are formed of a dielectric having a relative permittivity of not less than 8 for example.

Preferably, the average particle diameter of the dielectric particles is smaller than that of the conductive particles forming each layer. The average particle diameter of the dielectric particles is preferably not more than 1 µm for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A structural body comprising:
   a first dielectric layer formed on a first substrate and including first conductive particles, each surface of the first conductive particles being entirely covered with a first dielectric film; and
   a second dielectric layer wherein a volume ratio of a dielectric in the second dielectric layer is higher than a volume ratio of a dielectric in the first dielectric layer, the second dielectric layer including an upper dielectric layer and a lower dielectric layer,
   wherein one surface of the first dielectric layer is in contact with the upper dielectric layer included in the second dielectric layer and the other surface of the first dielectric layer is in contact with the lower dielectric layer included in the second dielectric layer.

2. The structural body according to claim 1, wherein the first dielectric layer is sandwiched between the upper dielectric layer and the lower dielectric layer.

3. The structural body according to claim 1, wherein the second dielectric layer is formed of dielectric particles formed on a substrate.

4. The structural body according to claim 3, wherein the dielectric particles are included between the first conductive particles.

5. The structural body according to claim 4, wherein an average particle diameter of the dielectric particles is smaller than an average particle diameter of the first conductive particles.

6. The structural body according to claim 1, wherein the first dielectric film is thicker than a natural oxide film formed on each surface of the first conductive particles.

7. The structural body according to claim 1, wherein the first dielectric layer includes a high dielectric constant insulating layer.

8. A structural body comprising:
   a first dielectric layer formed on a first substrate and including first conductive particles, each surface of the first conductive particles being entirely covered with a first dielectric film; and
   a second dielectric layer formed on the first dielectric layer wherein a volume ratio of a dielectric in the second dielectric layer is higher than a volume ratio of a dielectric in the first dielectric layer, wherein the second dielectric layer is formed on a second substrate and includes second conductive particles, each surface of the second conductive particles being entirely covered with a second dielectric film.

9. The structural body according to claim 8, wherein dielectric particles are included between the first conductive particles and between the second conductive particles; and a volume ratio of the dielectric particles in the second dielectric layer is higher than a volume ratio of the dielectric particles in the first dielectric layer.

10. The structural body according to claim 9, wherein an average particle diameter of the dielectric particles is smaller than an average particle diameter of the first conductive particles and an average particle diameter of the second conductive particles.

11. The structural body according to claim 8, wherein the second dielectric film is thicker than the first dielectric film.

12. The structural body according to claim 8, wherein the first dielectric film is thicker than a natural oxide film formed on each surface of the first conductive particles; and the second dielectric film is thicker than a natural oxide film formed on each surface of the second conductive particles.

13. A capacitor comprising:
a first dielectric layer formed on a first substrate and including first conductive particles, each surface of the first conductive particles being entirely covered with a first dielectric film;
a second dielectric layer wherein a volume ratio of a dielectric in the second dielectric layer is higher than a volume ratio of a dielectric in the first dielectric layer, the second dielectric layer including an upper dialectic layer and a lower dielectric layer;
a first electrode formed on a first surface of a structural body including the first dielectric layer and the second dielectric layer; and
a second electrode formed on a second surface of the structural body,
wherein one surface of the first dielectric layer is in contact with the upper dielectric layer included in the second dielectric layer and the other surface of the first dielectric layer is in contact with the lower dielectric layer included in the second dielectric layer.

14. The capacitor according to claim 13, wherein the second dielectric layer covers a side surface of the first dielectric layer which is different from the first and second surfaces, and a portion of the first or second electrode.

15. The capacitor according to claim 13, wherein the first dielectric layer includes a high dielectric constant insulating layer.

16. A method of fabricating a capacitor, comprising:
jetting first particles to a surface of a first structure, together with a gas, to cause the first particles to form a lower dielectric film so as to fix the first particles onto the first structure;
jetting second particles to a surface of the lower dielectric film, together with a gas, to cause the second particles to form a first dielectric film so as to fix the second particles onto the lower dielectric film;
jetting first particles to a surface of the first dielectric film, together with a gas, to cause the first particles to form an upper dielectric film so as to fix the first particles onto the first dielectric film; and
forming electrodes on a structural body including the lower dielectric film, the first dielectric film and the upper dielectric film,
wherein a volume ratio of a dielectric portion in the lower dielectric film and the upper dielectric film to a total volume of the first particles is higher than a volume ratio of a dielectric portion in the first dielectric film to a total volume of the second particles.

17. The method of fabricating a capacitor according to claim 16, wherein: the jetting of the second particles is performed after the jetting of the first particles; and the jetting of the first particles is again performed after the jetting of the second particles.

* * * * *